US012606489B2

(12) United States Patent
Takai

(10) Patent No.: US 12,606,489 B2
(45) Date of Patent: *Apr. 21, 2026

(54) ZIRCONIA POWDER, ZIRCONIA SINTERED BODY, AND METHOD FOR PRODUCING ZIRCONIA SINTERED BODY

(71) Applicant: DAIICHI KIGENSO KAGAKU KOGYO CO., LTD., Osaka (JP)

(72) Inventor: Masayuki Takai, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 1030 days.

This patent is subject to a terminal disclaimer.

(21) Appl. No.: 17/755,370

(22) PCT Filed: Oct. 6, 2021

(86) PCT No.: PCT/JP2021/036910
§ 371 (c)(1),
(2) Date: Apr. 27, 2022

(87) PCT Pub. No.: WO2022/075345
PCT Pub. Date: Apr. 14, 2022

(65) Prior Publication Data
US 2022/0380258 A1 Dec. 1, 2022

(30) Foreign Application Priority Data
Oct. 9, 2020 (JP) ................................. 2020-170991

(51) Int. Cl.
*C04B 35/48* (2006.01)
(52) U.S. Cl.
CPC ...... *C04B 35/48* (2013.01); *C04B 2235/3208* (2013.01); *C04B 2235/3229* (2013.01);
(Continued)

(58) Field of Classification Search
CPC .. C04B 35/48; C04B 2235/3246; C01G 25/00
See application file for complete search history.

(56) References Cited

U.S. PATENT DOCUMENTS

2008/0119585 A1* 5/2008 Van Lelieveld ......... A61K 6/71
523/105
2014/0011661 A1* 1/2014 Krstic ................... C04B 35/486
501/134
(Continued)

FOREIGN PATENT DOCUMENTS

EP 3 345 870 A1 7/2018
JP 2006-240928 A 9/2006
(Continued)

OTHER PUBLICATIONS

The extended European search report issued by the European Patent Office on Oct. 16, 2023, which corresponds to European Patent Application No. 21877644.1-1108 and is related to U.S. Appl. No. 17/755,370.
(Continued)

*Primary Examiner* — Amber R Orlando
*Assistant Examiner* — Cameron K Miller
(74) *Attorney, Agent, or Firm* — Studebaker Brackett PLLC

(57) ABSTRACT

A zirconia powder containing a stabilizer, and having a specific surface area of 20 $m^2$/g or more and 60 $m^2$/g or less and a particle diameter $D_{50}$ of 0.1 μm or more and 0.7 μm or less, in which in a range of 10 nm or more and 200 nm or less in a pore distribution based on a mercury intrusion method, a peak top diameter in a pore volume distribution is 20 nm or more and 85 nm or less, a pore volume is 0.2 ml/g or more and less than 0.5 ml/g, and a pore distribution width is 40 nm or more and 105 nm or less.

17 Claims, 3 Drawing Sheets

(52) U.S. Cl.
   CPC ................. *C04B 2235/3246* (2013.01); *C04B 2235/5436* (2013.01)

(56) References Cited

U.S. PATENT DOCUMENTS

| | | | |
|---|---|---|---|
| 2014/0370453 A1 | 12/2014 | Fujisaki et al. | |
| 2016/0022378 A1* | 1/2016 | Hansen .............. | A61C 13/0001 433/219 |
| 2016/0081777 A1* | 3/2016 | Yamada ............... | A61C 13/083 428/220 |
| 2018/0282225 A1* | 10/2018 | Takai ................... | C04B 35/486 |
| 2022/0380261 A1* | 12/2022 | Takai ................... | C01G 25/02 |

FOREIGN PATENT DOCUMENTS

| | | |
|---|---|---|
| JP | 2015-221727 A | 12/2015 |
| WO | 2017/170565 A1 | 10/2017 |

OTHER PUBLICATIONS

Notification of Transmittal of Translation of the International Preliminary Report on Patentability and Translation of Written Opinion of the International Searching Authority; PCT/JP2021/036910; mailed on Apr. 20, 2023.

An Office Action; "Notice of Reasons for Refusal," mailed by the Japanese Patent Office on Oct. 4, 2022, which corresponds to Japanese Patent Application No. 2022-523223 and is related to U.S. Appl. No. 17/755,370; with English language translation.

International Search Report issued in PCT/JP2021/036910; mailed Dec. 14, 2021.

* cited by examiner

ZIRCONIA POWDER, ZIRCONIA SINTERED BODY, AND METHOD FOR PRODUCING ZIRCONIA SINTERED BODY

TECHNICAL FIELD

The present invention relates to a zirconia powder, a method for producing a zirconia powder, a zirconia sintered body, and a method for producing a zirconia sintered body.

BACKGROUND ART

Zirconia is used in various applications with utilization of its mechanical strength, translucency, refractive index, etc. In recent years, resistance to hydrothermal degradation has been required for further enhancing the function of zirconia, and improvement of low-temperature sinterability has been studied.

Patent Document 1 discloses a zirconia fine powder containing one or more oxides of yttria, calcia, magnesia, and ceria as a stabilizer, in which the average particle diameter of the zirconia fine powder is less than 0.5 μm, and the proportion of particles at 1 μm in a cumulative curve of particle size distribution is 100% (see claim 1). Patent Document 1 describes that the zirconia fine powder has good moldability and low-temperature sinterability, and is also superior in reliability of quality when formed into a sintered body (see paragraph [0036]). Patent Document 1 also discloses, as a method for producing the zirconia fine powder, a method for producing a zirconia powder by drying, calcining and then pulverizing a hydrated zirconia sol obtained by hydrolysis of an aqueous zirconium salt solution, in which one or more compounds of yttrium, calcium, magnesium, and cerium are added as raw materials of a stabilizer to the hydrated zirconia sol obtained under the condition that the reaction rate of hydrolysis is 98% or more, the resulting mixture is dried, calcined at 900 to 1200° C. to afford a zirconia powder, which is then wet-pulverized using zirconia balls having a diameter of 3 mm or less until the average particle diameter of the zirconia powder becomes 0.5 μm or less (see claim 9).

Patent Document 2 discloses a zirconia sintered body that is a zirconia sintered body containing 0.05 to 3% by weight of alumina and having an yttria concentration of 2 to 4 mol %, in which the relative density of the zirconia sintered body is 99.7% or more, the average particle diameter of crystal particles is 0.1 to 0.3 μm, the bending strength is 1600 MPa or more, and the monoclinic crystal phase ratio is 5% or less after being immersed in hot water at 140° C. for 75 hours (see claim 1). Patent Document 2 describes that the zirconia sintered body is superior in strength and toughness, and in addition, is superior in water heat degradation resistance (see paragraph [0042]). Patent Document 2 also discloses, as a method for producing the zirconia sintered body, a method for producing a zirconia sintered body, in which a zirconia powder having an average particle diameter of secondary particles of 0.1 to 0.4 μm, having a ratio of [particle diameter of the secondary particles]/[average particle diameter of primary particles measured with an electron microscope] of 1 to 8, containing an aluminum compound in an amount of 0.05 to 3% by weight in terms of alumina, and having an yttria concentration of 2 to 4 mol % is molded and then pre-sintered at 1100 to 1200° C., and the obtained pre-sintered body is subjected to hot isostatic pressing treatment at a pressure of 50 to 500 MPa and a temperature of 1150 to 1250° C. (see claim 3).

Patent Document 3 discloses a zirconia powder containing 2 to 6 mol % of yttria, having a volume of pores with a pore diameter of 200 nm or less of 0.14 to 0.28 mL/g, and having a relative molding density of 44 to 55% when the zirconia powder is molded at a molding pressure of 1 t/cm², in which the relative molding density is represented by the following formula (1) (see claim 1).

$$\text{Relative molding density (\%)} = (\text{molding density/theoretical sintered density}) \times 100 \qquad (1)$$

Patent Document 3 describes that the zirconia powder has a high molding density when molded, and can afford a sintered body having a sintered density that is 99.5% or more of the theoretical sintered density (see paragraph [0015]).

PRIOR ART DOCUMENT

Patent Documents

Patent Document 1: JP-A-2006-240928
Patent Document 2: JP-A-2015-221727
Patent Document 3: WO 2017/170565

SUMMARY OF THE INVENTION

Problems to be Solved by the Invention

In Patent Document 1 and Patent Document 2, focusing on secondary particles of a zirconia powder, it is attempted to obtain low-temperature sinterability by adjusting the particle diameter, etc.

Meanwhile, as a result of intensive studies on improvement of low-temperature sinterability of a zirconia powder, the present inventor has come to think that sinterability is not determined only by secondary particles, and the aggregation property of primary particles constituting the secondary particles should also be considered. That is, the present inventor has found that sinterability varies depending on non-uniformity of aggregation of primary particles constituting secondary particles and the degree of aggregation of primary particles that are coarsely or densely packed even when the secondary particles have a similar secondary particle diameter. Hereinafter, this will be described in detail.

A sintering step of sintering a molded body of a zirconia powder can also be regarded as a step of removing pores in the molded body. In order to reduce the number of pores in the molded body, in the conventional technique (for example, Patent Document 1 and Patent Document 2), the interparticle spaces of secondary particles in the molded body (the interparticle spaces of secondary particles of the zirconia powder constituting the molded body) is made small, in other words, the secondary particle diameter is made small, and the distribution of the secondary particle diameter is made as small as possible. The interparticle spaces of secondary particles in a molded body can be reduced also by the molding conditions for producing the molded body (molding pressure, binder, molding method, etc.).

As described above, the control of the secondary particle diameter of the zirconia powder has been conventionally studied for the sake of low-temperature sinterability, but there is no example of investigating the improvement of the sinterability of the zirconia powder by controlling the aggregation of the primary particles constituting the secondary particles.

Meanwhile, Patent Document 3 discloses that a high sintered density is obtained by controlling the volume of pores with a pore diameter of 200 nm or less within a specific range with respect to interparticle spaces of primary particles of a zirconia powder (see paragraph [0013]). In Patent Document 3, however, low-temperature sinterability is not studied. That is, Patent Document 3 only discloses a technique in which the sintered density at 1450° C. is made to be 99.5% or more by controlling the interparticle spaces of primary particles of a zirconia powder (paragraphs [0044] and [0146], and Table 1 in [0149]), and does not study the sinterability at a low temperature (for example, about 1200° C. to 1350° C.)

Further, in Patent Document 3, only the volume of pores with a pore diameter of 200 nm or less within a specific range is studied with respect to interparticle spaces of primary particles of a zirconia powder, and the size and distribution of each interparticle space are not studied.

In the zirconia powder of Patent Document 3, the peak top diameter of the pore volume distribution is not in the range of 20 nm or more and 85 nm or less in the range of 10 nm or more and 200 nm or less in a pore distribution based on a mercury intrusion method. The zirconia powder of Patent Document 3 does not have a pore distribution width within the range of 40 nm or more and 105 nm or less in the range of 10 nm or more and 200 nm or less in a pore distribution based on a mercury intrusion method. In order to make this clear, in the section of Examples in the present description, the zirconia powder of Example 1 of Patent Document 3 is shown as Comparative Example 2 in the present description.

The present invention has been devised in view of the above-described problems, and an object of the present invention is to provide a zirconia powder that can be sintered at a low temperature and can afford a sintered body having a high sintered density. Another object of the present invention is to provide a zirconia sintered body obtained using the zirconia powder. Another object of the present invention is to provide a method for producing the zirconia sintered body.

Means for Solving the Problems

The present inventors have diligently studied zirconia powders. As a result, the present inventors have found that low-temperature sintering can be performed and a sintered body having a high sintered density can be obtained by adopting the following configuration, and thus have accomplished the present invention.

That is, the zirconia powder according to the present invention comprises a stabilizer, and has a specific surface area of 20 m²/g or more and 60 m²/g or less and a particle diameter $D_{50}$ of 0.1 μm or more and 0.7 μm or less, in which
in a range of 10 nm or more and 200 nm or less in a pore distribution based on a mercury intrusion method, a peak top diameter in a pore volume distribution is 20 nm or more and 85 nm or less, a pore volume is 0.2 ml/g or more and less than 0.5 ml/g, and a pore distribution width is 40 nm or more and 105 nm or less.

The "range of 10 nm or more and 200 nm or less in a pore distribution based on a mercury intrusion method" is a range in which interparticle spaces of primary particles of a zirconia powder can be present.

According to the above configuration, since in the range of 10 nm or more and 200 nm or less in the pore distribution based on the mercury intrusion method, the peak top diameter in the pore volume distribution is 20 nm or more and 85 nm or less, and the pore distribution width is 40 nm or more and 105 nm or less, so that pores (interparticle spaces of primary particles) are small and uniform in size (the distribution is sharp).

Accordingly, the primary particles constituting the secondary particles are uniformly and densely aggregated, and there are no large pores.

Here, zirconia particles (including primary particles and secondary particles) have a characteristic that the particles become less prone to be sintered as the pore volume increases. That is, in order to sinter zirconia particles at a low temperature, it is necessary not only to reduce the size of pores derived from interparticle spaces of primary particles in secondary particles and sharpen the distribution of the pores, but also to simultaneously reduce the volume of the pores derived from the interparticle spaces of the primary particles.

Accordingly, in the present invention, the pore volume in a range of 10 nm or more and 200 nm or less in a pore distribution based on a mercury intrusion method is set to 0.2 ml/g or more and less than 0.5 ml/g. This results in a configuration in which the volume of the pores derived from the interparticle spaces of primary particles is small and there are no large pores, and it becomes possible to obtain a sintered body having a high sintered density.

As described above, according to the zirconia powder according to the present invention, by controlling the pore diameter, the pore distribution, and the pore volume of the interparticle spaces of primary particles, it is possible to sinter the zirconia powder at a low temperature and it is also possible to obtain a sintered body having a high sintered density.

Further, according to the above configuration, since the particle diameter $D_{50}$ is 0.7 μm or less and the particle diameter of the secondary particles is relatively small, the interparticle spaces of the secondary particles can be made small. As a result, the zirconia powder is superior in low-temperature sinterability. In addition, since the interparticle spaces of the secondary particles are small, a sintered body having a high sintered density can be obtained.

In addition, according to the above configuration, since the specific surface area is 20 m²/g or more and 60 m²/g or less, the zirconia powder is superior in low-temperature sinterability. This will be described below.

In order to sinter a zirconia powder at about 1100° C. to 1350° C., which is lower than the conventional temperature, it is effective to increase the specific surface area. Conventionally, however, it is difficult to control the grain growth rate at the time of producing the zirconia powder, and it has been considered preferable to set the specific surface area to less than 20 m²/g in order to prevent pores from remaining in the zirconia powder as much as possible.

Meanwhile, according to the present invention, since the interparticle spaces of primary particles are controlled, a large number of pores do not remain in the zirconia powder even when the specific surface area is 20 m²/g or more. Accordingly, when the specific surface area is 20 m²/g or more, the low-temperature sinterability can be improved.

Further, according to the above configuration, due to containing the stabilizer, the zirconia powder can be suitably sintered at a low temperature. Note that, if no stabilizer is contained, the zirconia powder becomes less prone to be sintered and cannot be sintered at a low temperature even if the interparticle spaces of primary particles are uniformly and densely aggregated.

It is preferable in the above configuration that the stabilizer is an oxide of one or more elements selected from among alkaline earth metals and rare earth elements.

It is also preferable in the above configuration that the stabilizer is one or more compounds selected from the group consisting of $Y_2O_3$, $CeO_2$, $Sc_2O_3$, $CaO$, $Er_2O_3$, and $Yb_2O_3$.

It is also preferable in the above configuration that the stabilizer is one or more compounds selected from the group consisting of $Y_2O_3$, $Sc_2O_3$, $CaO$, $Er_2O_3$, and $Yb_2O_3$.

It is preferable in the above configuration that the stabilizer is $Y_2O_3$ and a content of the $Y_2O_3$ based on an entire amount of the zirconia powder is 1.4 mol % or more and 7.5 mol % or less.

When the content of the $Y_2O_3$ is 1.4 mol % or more and 7.5 mol % or less, a zirconia sintered body obtained by sintering the zirconia powder has more enhanced mechanical strength.

It is preferable in the above configuration that the stabilizer is $CeO_2$ and a content of the $CeO_2$ based on an entire amount of the zirconia powder is 10 mol % or more and 20 mol % or less.

When the content of the $CeO_2$ is 10 mol % or more and 20 mol % or less, a zirconia sintered body obtained by sintering the zirconia powder has more enhanced mechanical strength.

It is preferable in the above configuration that the stabilizer is $CeO_2$ and a content of the $CeO_2$ based on an entire amount of the zirconia powder is 10 mol % or more and 14 mol % or less.

When the content of the $CeO_2$ is 10 mol % or more and 14 mol % or less, a zirconia sintered body obtained by sintering the zirconia powder has more enhanced mechanical strength.

It is preferable in the above configuration that the stabilizer is $Sc_2O_3$ and a content of $Sc_2O_3$ based on an entire amount of the zirconia powder is 1.4 mol % or more and 7.5 mol % or less.

When the content of the $Sc_2O_3$ is 1.4 mol % or more and 7.5 mol % or less, a zirconia sintered body obtained by sintering the zirconia powder has more enhanced mechanical strength.

It is preferable in the above configuration that the stabilizer is $Er_2O_3$ and a content of the $Er_2O_3$ based on an entire amount of the zirconia powder is 1.4 mol % or more and 7.5 mol % or less.

When the content of the $Er_2O_3$ is 1.4 mol % or more and 7.5 mol % or less, a zirconia sintered body obtained by sintering the zirconia powder has more enhanced mechanical strength.

It is preferable in the above configuration that the stabilizer is $CaO$ and a content of the $CaO$ based on an entire amount of the zirconia powder is 3.5 mol % or more and 17 mol % or less.

When the content of the $CaO$ is 3.5 mol % or more and 17 mol % or less, a zirconia sintered body obtained by sintering the zirconia powder has more enhanced mechanical strength.

It is preferable in the above configuration that the stabilizer is $Yb_2O_3$ and a content of the $Yb_2O_3$ based on an entire amount of the zirconia powder is 1.4 mol % or more and 7.5 mol % or less.

When the content of the $Yb_2O_3$ is 1.4 mol % or more and 7.5 mol % or less, a zirconia sintered body obtained by sintering the zirconia powder has more enhanced mechanical strength.

It is preferable in the above configuration that the zirconia-based porous body has a specific surface area of 22 m²/g or more and 57 m²/g or less.

It is preferable in the above configuration that the particle diameter $D_{50}$ is 0.1 μm or more and less than 0.3 μm.

In the above configuration, alumina and one or more metal oxides selected from the group consisting of metal oxides having a Tammann temperature of 1200° C. or lower may be contained in an amount of 0.005 mass % or more and 2 mass % or less.

When alumina and one or more metal oxides selected from the group consisting of metal oxides having a Tammann temperature of 1200° C. or lower are contained within the above numerical range, the metal oxides function as a sintering aid, and therefore the zirconia powder is more improved in low-temperature sinterability.

Alumina functions as a sintering aid by removing pores by inhibiting grain growth of zirconia by being present at the grain boundaries of the primary particles and the secondary particles.

In addition, the metal oxide having a Tammann temperature of 1200° C. or lower (absolute temperature of 1473.15 K or lower) has a certain degree of fluidity at a temperature during low-temperature sintering (1200° C. to 1350° C.), and therefore, the metal oxide functions as a sintering aid by promoting the joining of the primary particles and the secondary particles to increase the sintering rate.

Here, when the Tammann temperature expressed in absolute temperature is denoted by Td and the melting point of a solid expressed in absolute temperature is denoted by Tm, there is a relationship of Td=0.33 Tm for metals, Td=0.757 Tm for oxides or the like, and Td=0.90 Tm for covalent compounds (these are referred to as Tammann's law).

Thus, in the present description, the "Tammann temperature" refers to a value according to the Tamman's law.

It is also preferable in the above configuration that the content of the alumina and one or more metal oxides selected from the group consisting of metal oxides having a Tammann temperature of 1200° C. or lower is less than 0.005 mass %.

The phrase that the content of alumina and one or more metal oxides selected from the group consisting of metal oxides having a Tammann temperature of 1200° C. or lower is less than 0.005 mass % means that no sintering aid is contained.

In the zirconia powder, the pore diameter, pore distribution, and pore volume of the interparticle spaces of primary particles are within the above numerical ranges, and therefore even when no sintering aid is added, it is possible to sinter the zirconia powder at a low temperature and it is also possible to obtain a sintered body having a high sintered density.

In the above configuration, the zirconia powder may contain one or more elements selected from the group consisting of Fe, V, Er, Mn, Co, Cr, Tb, Zn, Cu, and Ti.

When the zirconia sintered body contains one or more elements selected from the group consisting of Fe, V, Mn, Co, Cr, Tb, Zn, Cu, and Ti, the zirconia sintered body can be suitably colored.

The zirconia sintered body according to the present invention is obtained by pressureless sintering using the zirconia powder.

Since the zirconia sintered body is obtained by pressureless sintering using the zirconia powder, the zirconia sintered body has been sintered at a low temperature and has a high sintered density.

The method for producing a zirconia sintered body according to the present invention comprises:

step X of molding the zirconia powder to obtain a molded body; and step Y of sintering the molded body at 1100° C. or higher and 1350° C. or lower and for 1 hour or more and 5 hours or less after the step X.

According to the above configuration, since the zirconia powder is used, it is possible to obtain a sintered body having a high sintered density under sintering conditions at a low temperature of 1100° C. or higher and 1350° C. or lower.

Effect of the Invention

According to the present invention, it is possible to provide a zirconia powder that can be sintered at a low temperature and can afford a sintered body having a high sintered density. In addition, it is possible to provide a zirconia sintered body obtained using the zirconia powder. The present invention can provide a method for producing the zirconia sintered body.

MODE FOR CARRYING OUT THE INVENTION

Figure 1:
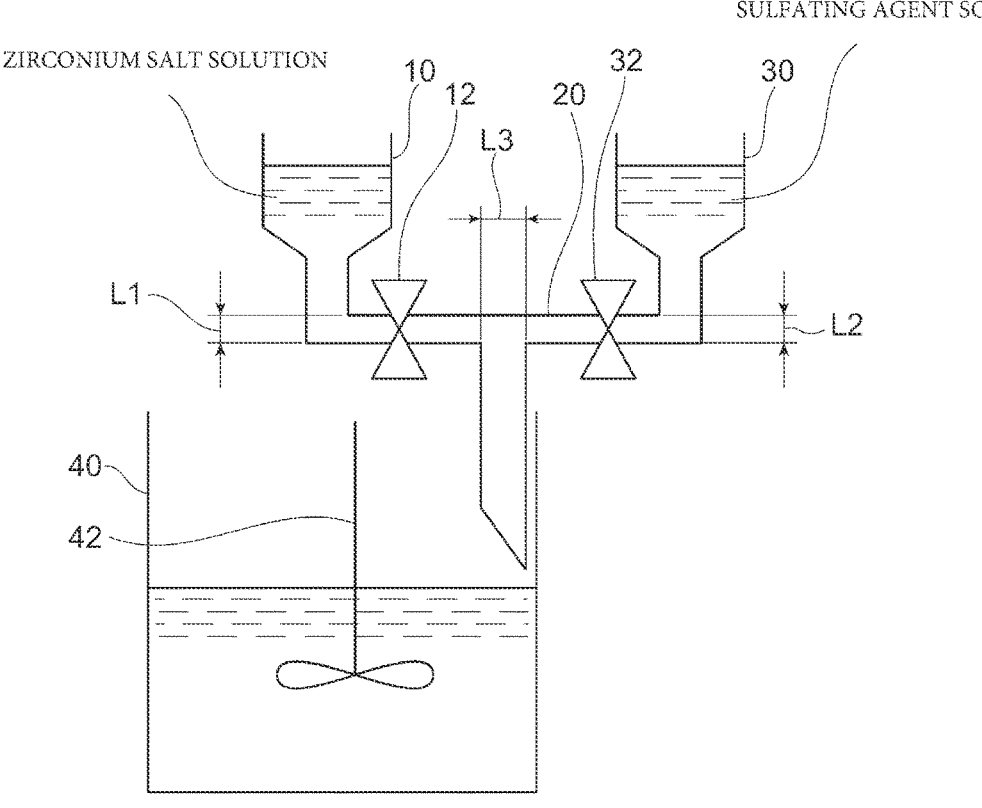
FIG. 1 is a schematic view for explaining a method for producing a zirconia powder according to the present embodiment.

Hereinafter, embodiments of the present invention will be described. However, the present invention is not limited only to these embodiments. In the present description, zirconia (zirconium oxide) is common one, and contains 10 mass % or less of impure metal compounds including hafnia. In the present specification, the terms "comprise" and "contain" include the concepts of "comprise", "contain", "substantially consist of", and "consist of".

[Zirconia Powder]

The zirconia powder according to the present embodiment comprises a stabilizer, and has a specific surface area of 20 $m^2/g$ or more and 60 $m^2/g$ or less and a particle diameter $D_{50}$ of 0.1 μm or more and 0.7 μm or less, in which in a range of 10 nm or more and 200 nm or less in a pore distribution based on a mercury intrusion method, a peak top diameter in a pore volume distribution is 20 nm or more and 85 nm or less, a pore volume is 0.2 ml/g or more and less than 0.5 ml/g, and a pore distribution width is 40 nm or more and 105 nm or less.

The zirconia powder comprises primary particles comprising zirconia as a main component. All or some of the primary particles are aggregated to form secondary particles. That is, the zirconia powder comprises primary particles that are not aggregated and secondary particles in which primary particles are aggregated.

It is noted that, in the zirconia powder, the amount of primary particles that do not form secondary particles and exist in the state of unaggregated primary particles is very small, and is, for example, less than 1 mass % of the entire primary particles (namely, the total of unaggregated primary particles and primary particles aggregated and forming secondary particles). That is, the zirconia powder may contain a very small amount of unaggregated primary particles, but most of the zirconia powder is composed of secondary particles.

The phrase "comprising zirconia as a main component" means that the primary particles contain zirconia in an amount of 70 mass % or more based on 100 mass % of the primary particles. That is, in the present description, primary particles comprising zirconia as a main component refer to primary particles containing zirconia in an amount of 70 mass % or more. The content of zirconia contained in the primary particles is preferably 74 mass % or more, more preferably 80 mass % or more, and still more preferably 85 mass % or more.

<Pore Distribution>

1. Peak Top Diameter of Interparticle Spaces of Primary Particles

The zirconia powder has a peak top diameter of 20 nm or more and 85 nm or less in a pore volume distribution in a range of 10 nm or more and 200 nm or less in a pore distribution based on a mercury intrusion method. The peak top diameter is preferably 25 nm or more, more preferably 30 nm, still more preferably 32 nm, and particularly preferably 35 nm or more. The peak top diameter is preferably 65 nm or less, more preferably 60 nm or less, still more preferably 57 nm or less, and particularly preferably 54 nm or less.

When there are a plurality of peaks in the range of 10 nm or more and 200 nm or less in the pore distribution, the phrase "the peak top diameter is 20 nm or more and 85 nm or less in the pore volume distribution" as used herein means that all the peak top diameters in the range of 10 nm or more and 200 nm or less in the pore distribution are in the range of 20 nm or more and 85 nm or less.

2. Pore Distribution Width of Interparticle Spaces of Primary Particles

The zirconia powder has a pore distribution width of 40 nm or more and 105 nm or less in a range of 10 nm or more and 200 nm or less in a pore distribution based on a mercury intrusion method. The pore distribution width is preferably 43 nm or more, more preferably 46 nm or more, still more preferably 50 nm or more, and particularly preferably 55 nm or more. The pore distribution width is preferably 100 nm or less, more preferably 95 nm or less, still more preferably 90 nm or less, particularly preferably 85 nm or less, and especially preferably 80 nm or less.

Here, the pore distribution width refers to a width of a peak at which the log differential pore volume (see, for example, FIG. 2) is 0.1 ml/g or more.

In the case where there are a plurality of peaks in the range of 10 nm or more and 200 nm or less in the pore distribution, the phrase "a pore distribution width is 40 nm or more and 105 nm or less" as used herein means that where, in a graph showing a pore distribution with pore diameter as abscissa against log differential pore volume as ordinate (see, for example, FIG. 2), a point intersecting with a log differential pore volume of 0.1 mL/g for the first time as viewed from a side where the pore diameter is smaller (a point intersecting while ascending) is defined as a minimum diameter and a point intersecting with the log differential pore volume of 0.1 mL/g again (a point intersecting while descending) is defined as a maximum diameter, the difference between the maximum diameter and the minimum diameter is 40 nm or more and 105 nm or less.

3. Pore Volume of Interparticle Spaces of Primary Particles

The zirconia powder has a pore volume of 0.2 ml/g or more and less than 0.5 ml/g in a range of 10 nm or more and 200 nm or less in a pore distribution based on a mercury intrusion method. The total pore volume is preferably 0.22 ml/g or more, more preferably 0.25 ml/g or more, still more preferably 0.3 ml/g or more, particularly preferably 0.35 ml/g or more, and especially preferably 0.4 ml/g or more. The total pore volume is preferably 0.48 ml/g or less, more preferably 0.46 ml/g or less, and particularly preferably 0.44 ml/g or less.

The "range of 10 nm or more and 200 nm or less in a pore distribution based on a mercury intrusion method" is a range in which interparticle spaces of primary particles of a zirconia powder can be present.

In the zirconia powder according to the present embodiment, in the range of 10 nm or more and 200 nm or less in the pore distribution based on the mercury intrusion method, the peak top diameter in the pore volume distribution is 20 nm or more and 85 nm or less and the pore distribution width is 40 nm or more and 105 nm or less, so that pores (interparticle spaces of primary particles) are small and uniform in size (the distribution is sharp).

Accordingly, the primary particles constituting the secondary particles are uniformly and densely aggregated, and there are no large pores.

Here, zirconia particles (including primary particles and secondary particles) have a characteristic that the particles become less prone to be sintered as the pore volume increases. That is, in order to sinter zirconia particles at a low temperature, it is necessary not only to reduce the size of pores derived from interparticle spaces of primary particles in secondary particles and sharpen the distribution of the pores, but also to simultaneously reduce the volume of the pores derived from the interparticle spaces of the primary particles.

Accordingly, in the zirconia powder according to the present embodiment, the pore volume in a range of 10 nm or more and 200 nm or less in a pore distribution based on a mercury intrusion method is set to 0.2 ml/g or more and less than 0.5 ml/g. This results in a configuration in which the volume of the pores derived from the interparticle spaces of primary particles is small and there are no large pores, and it becomes possible to obtain a sintered body having a high sintered density.

As described above, according to the zirconia powder according to the present embodiment, by controlling the pore diameter, the pore distribution, and the pore volume of the interparticle spaces of primary particles, it is possible to sinter the zirconia powder at a low temperature and it is also possible to obtain a sintered body having a high sintered density.

The peak top diameter, the pore distribution width, and the pore volume refer to values obtained by the methods described in Examples.

<Particle diameter $D_{50}$>

The particle diameter $D_{30}$ of the zirconia powder is 0.1 μm or more and 0.7 μm or less. The particle diameter $D_{30}$ is preferably 0.12 μm or more, more preferably 0.14 μm or more, still more preferably 0.16 μm or more, and particularly preferably 0.2 μm or more. The particle diameter $D_{30}$ is preferably 0.62 μm or less, more preferably 0.55 μm or less, still more preferably 0.48 μm or less, particularly preferably 0.4 μm or less, especially preferably 0.3 μm or less, and extremely preferably less than 0.3 μm. The particle diameter $D_{50}$ refers to a value obtained by the method described in Examples.

When the particle diameter $D_{50}$ is measured, not only secondary particles but also unaggregated primary particles may be contained, but the amount of unaggregated primary particles that may be contained in the zirconia powder is very small. Therefore, the particle diameter $D_{50}$ may be regarded as representing the particle diameter $D_{50}$ of the secondary particles, that is, the average particle diameter of the secondary particles.

Since the particle diameter $D_{50}$ of the zirconia powder is 0.7 μm or less and the particle diameter of the secondary particles is relatively small, the interparticle spaces of the secondary particles can be made small. As a result, the zirconia powder is superior in low-temperature sinterability. In addition, since the interparticle spaces of the secondary particles are small, a sintered body having a high sintered density can be obtained.

<Specific Surface Area>

The specific surface area of the zirconia powder is 20 m²/g or more and 60 m²/g or less. The specific surface area is preferably 22 m²/g or more, more preferably 24 m²/g or more, still more preferably 30 m²/g or more, and particularly preferably 35 m²/g or more. The specific surface area is preferably 57 m²/g or less, more preferably 54 m²/g, still more preferably 52 m²/g, and particularly preferably 49 m²/g.

In order to sinter a zirconia powder at about 1100° C. to 1350° C., which is lower than the conventional temperature, it is effective to increase the specific surface area. Conventionally, however, it is difficult to control the grain growth rate at the time of producing the zirconia powder, and it has been considered preferable to set the specific surface area to less than 20 m²/g in order to prevent pores from remaining in the zirconia powder as much as possible.

Meanwhile, according to the zirconia powder according to the present embodiment, since the interparticle spaces of primary particles are controlled, a large number of pores do not remain in the zirconia powder even when the specific surface area is 20 m²/g or more. Accordingly, when the specific surface area is 20 m²/g or more, the low-temperature sinterability can be improved.

The specific surface area refers to a value obtained by the method described in Examples.

<Composition>

The zirconia powder according to the present embodiment comprises zirconia as a main component. Specifically, as described above, the zirconia powder contains secondary particles in which primary particles are aggregated and a very small amount of unaggregated primary particles.

The zirconia powder comprises a stabilizer. The stabilizer is contained in the primary particles in a form of solid-dissolving or the like. Since the zirconia powder comprises the stabilizer, the zirconia powder can be suitably sintered at a low temperature.

The stabilizer is preferably an oxide of one or more elements selected from among alkaline earth metals and rare earth elements. The alkaline earth metals refer to Ca, Sr, Ba, and Ra. The rare earth elements refer to Sc, Y, La, Ce, Pr, Nd, Pm, Sm, Eu, Gd, Tb, Dy, Ho, Tm, Yb, and Lu. Among the rare earth elements, Y, Ce, and Yb are preferable. It is preferable that the zirconia powder contains neither Ra nor Pm. That is, it is more preferable that the zirconia powder contains oxides of one or more elements selected from among alkaline earth metals other than Ra and rare earth elements other than Pm.

It is also preferable that the stabilizer is one or more compounds selected from the group consisting of $Y_2O_3$, $CeO_2$, $Sc_2O_3$, $CaO$, $Er_2O_3$, and $Yb_2O_3$.

It is also preferable that the stabilizer is one or more compounds selected from the group consisting of $Y_2O_3$, $Sc_2O_3$, CaO, $Er_2O_3$, and $Yb_2O_3$.

The stabilizer may vary depending on the application, and from the viewpoint of cost, coloring, etc., $Y_2O_3$, $CeO_2$, CaO, and $Yb_2O_3$ are more preferable, $Y_2O_3$, $CeO_2$, and CaO are still more preferable, $Y_2O_3$ and CaO are particularly preferable, and $Y_2O_3$ is especially preferable.

When $Y_2O_3$ is used as the stabilizer, the content of the $Y_2O_3$ based on the entire amount of the zirconia powder is preferably 1.4 mol % or more and 7.5 mol % or less. The content of the $Y_2O_3$ is more preferably 1.5 mol % or more, still more preferably 1.6 mol % or more, particularly preferably 2 mol % or more, especially preferably 2.5 mol % or more, and extremely preferably 3 mol % or more. The content of the $Y_2O_3$ is more preferably 6.5 mol % or less, still more preferably 6 mol %, particularly preferably 5.6 mol % or less, especially preferably 5 mol % or less, and extremely preferably 4.5 mol % or less. When the content of the $Y_2O_3$ is 1.4 mol % or more and 7.5 mol % or less, a zirconia sintered body obtained by sintering the zirconia powder is more enhanced in mechanical strength.

When $CeO_2$ is used as the stabilizer, the content of the $CeO_2$ based on the entire amount of the zirconia powder is preferably 10 mol % or more and 20 mol % or less. The content of the $CeO_2$ is more preferably 11 mol % or more, and still more preferably 11.5 mol % or more. The content of the $CeO_2$ is more preferably 18 mol % or less, still more preferably 17 mol % or less, particularly preferably 16 mol % or less, especially preferably 14 mol % or less, and extremely preferably 12 mol % or less. When the content of the $CeO_2$ is 10 mol % or more and 20 mol % or less, a zirconia sintered body obtained by sintering the zirconia powder is more enhanced in mechanical strength. Among them, the content of the $CeO_2$ is preferably 10 mol % or more and 14 mol % or less.

When any one of $Sc_2O_3$, $Er_2O_3$, and $Yb_2O_3$ is used as the stabilizer, the content of the stabilizer based on the entire amount of the zirconia powder is preferably 1.4 mol % or more and 7.5 mol % or less. When any one of $Sc_2O_3$, $Er_2O_3$, and $Yb_2O_3$ is used, the content thereof is more preferably 1.5 mol % or more, still more preferably 1.6 mol % or more, particularly preferably 2 mol % or more, especially preferably 2.5 mol % or more, and extremely preferably 3 mol % or more. When any one of $Sc_2O_3$, $Er_2O_3$, and $Yb_2O_3$ is used, the content thereof is more preferably 6.5 mol % or less, still more preferably 6 mol %, particularly preferably 5.6 mol % or less, especially preferably 5 mol % or less, and extremely preferably 4.5 mol % or less. When any one of $Sc_2O_3$, $Er_2O_3$, and $Yb_2O_3$ is used and the content thereof is 1.4 mol % or more and 7.5 mol % or less, a zirconia sintered body obtained by sintering the zirconia powder is more enhanced in mechanical strength.

When CaO is used as the stabilizer, the content of the CaO based on the entire amount of the zirconia powder is preferably 3.5 mol % or more and 17 mol % or less. The content of the CaO is more preferably 3.8 mol % or more, and still more preferably 4.0 mol % or more. The content of the CaO is more preferably 15.0 mol % or less, and still more preferably 9.0 mol % or less. When the content of CaO is 3.5 mol % or more and 17 mol % or less, a zirconia sintered body obtained by sintering the zirconia powder is more enhanced in mechanical strength.

The zirconia powder may contain an additive. In the present description, the additive refers to an agent added as a mixture to zirconia particles. Examples of the additive include a sintering aid and a colorant. The additives include one that functions only as a sintering aid, one that functions only as a colorant, and one that functions as a sintering aid and also functions as a colorant. Hereinafter, the sintering aid and the colorant will be described.

The zirconia powder may contain 0.005 mass % or more and 2 mass % or less of alumina and one or more metal oxides selected from the group consisting of metal oxides having a Tammann temperature of 1200° C. or lower. Examples of the metal oxide having a Tammann temperature of 1200° C. or lower include oxides of iron, germanium, cobalt, chromium, and zinc. The content of the alumina and one or more metal oxides selected from the group consisting of metal oxides having a Tammann temperature of 1200° C. or lower is more preferably 0.01 mass % or more, still more preferably 0.03 mass % or more, particularly preferably 0.05 mass % or more, and especially preferably 0.07 mass % or more. The content of the alumina and one or more metal oxides selected from the group consisting of metal oxides having a Tammann temperature of 1200° C. or lower is more preferably 1.5 mass % or less, still more preferably 1.2 mass % or less, particularly preferably 0.5 mass % or less, and especially preferably 0.25 mass % or less. When alumina and one or more metal oxides selected from the group consisting of metal oxides having a Tammann temperature of 1200° C. or lower are contained within the above numerical range, the metal oxides function as a sintering aid, and therefore the zirconia powder is more improved in low-temperature sinterability.

Since the zirconia powder contains alumina, a reduction in the fracture toughness of a zirconia sintered body is likely to be suppressed. Furthermore, the translucency of the zirconia sintered body can be improved by adjusting the content of alumina.

The form of alumina is not particularly limited, and an alumina powder is preferable from the viewpoint of ensuring handling properties during the preparation of the zirconia powder (when mixing and dispersing in zirconia particles) and reducing residual impurities.

When the form of alumina is a powder, the average particle diameter of primary particles of alumina is not particularly limited, and the average particle diameter is, for example, 0.02 to 0.4 μm, preferably 0.05 to 0.3 μm, and more preferably 0.07 to 0.2 μm.

The zirconia powder may contain a sintering aid, but may not contain a sintering aid. Specifically, the content of the alumina and one or more metal oxides selected from the group consisting of metal oxides having a Tammann temperature of 1200° C. or lower in the zirconia powder may be less than 0.005 mass %. The phrase that the content of alumina and one or more metal oxides selected from the group consisting of metal oxides having a Tammann temperature of 1200° C. or lower is less than 0.005 mass % means that no sintering aid is contained.

The zirconia powder can be sintered at a low temperature because in the range of 10 nm or more and 200 nm or less in the pore distribution based on a mercury intrusion method, the peak top diameter in the pore volume distribution is 20 nm or more and 85 nm or less, the pore volume is 0.2 ml/g or more and less than 0.5 ml/g, and the pore distribution width is 40 nm or more and 105 nm or less. Therefore, even if a configuration containing no sintering aid is employed, low-temperature sintering can be performed.

The zirconia powder may comprise sinterable ceramics, a thermosetting resin, or the like in addition to alumina and the metal oxide having a Tammann temperature of 1200° C. or lower for the purpose of improving such characteristics as strength.

The zirconia powder may contain one or more elements selected from the group consisting of Fe, V, Mn, Co, Cr, Tb, Zn, Cu, and Ti. When the zirconia powder contains one or more elements selected from the group consisting of Fe, V, Mn, Co, Cr, Tb, Zn, Cu, and Ti as a coloring element, a zirconia sintered body obtained by sintering the zirconia powder can be suitably colored.

The form of the coloring element is not particularly limited, and the coloring element can be added in the form of an oxide or chloride or the like. Examples of the colorant containing the coloring element include $Fe_2O_3$, $V_2O_5$, $MnO_2$, $CoO$, $Cr_2O_3$, $Tb_4O_7$, $ZnO$, $CuO$, and $TiO_2$. The colorant is preferably added as a mixture to the zirconia powder.

When $Fe_2O_3$ is contained as the colorant, the content of the colorant is preferably 0.005 mass % or more and 1 mass % or less, and more preferably 0.05 mass % or more and 1.0 mass % or less where the entire amount of the zirconia powder is 100 mass %. When the content of the colorant is 0.005 mass % or more, intended coloring is easily obtained. That is, the color tone can be easily adjusted.

When $V_2O_5$ is contained as the colorant, the content thereof is preferably 0.005 mass % or more and 0.1 mass % or less, and more preferably 0.01 mass % or more and 0.05 mass % or less where the entire amount of the zirconia powder is 100 mass %. When the content of the colorant is 0.005 mass % or more, intended coloring is easily obtained. That is, the color tone can be easily adjusted.

When $MnO_2$ is contained as the colorant, the content thereof is preferably 0.005 mass % or more and 2 mass % or less, and more preferably 0.03 mass % or more and 1.1 mass % or less where the entire amount of the zirconia powder is 100 mass %. When the content of the colorant is 0.005 mass % or more, intended coloring is easily obtained. That is, the color tone can be easily adjusted.

When $Cr_2O_3$ is contained as the colorant, the content thereof is preferably 0.005 mass % or more and 2 mass % or less, and more preferably 0.1 mass % or more and 1.5 mass % or less where the entire amount of the zirconia powder is 100 mass %. When the content of the colorant is 0.005 mass % or more, intended coloring is easily obtained. That is, the color tone can be easily adjusted.

When $CoO$ is contained as the colorant, the content of the colorant is preferably 0.005 mass % or more and 2 mass % or less, and more preferably 0.01 mass % or more and 1.5 mass % or less where the entire amount of the zirconia powder is 100 mass %. When the content of the colorant is 0.005 mass % or more, intended coloring is easily obtained. That is, the color tone can be easily adjusted.

When $Tb_4O_7$ is contained as the colorant, the content of the colorant is preferably 0.005 mass % or more and 5 mass % or less, and more preferably 0.1 mass % or more and 3 mass % or less where the entire amount of the zirconia powder is 100 mass %. When the content of the colorant is 0.005 mass % or more, intended coloring is easily obtained. That is, the color tone can be easily adjusted.

When $ZnO$ is contained as the colorant, the content of the colorant is preferably 0.005 mass % or more and 1 mass % or less, and more preferably 0.1 mass % or more and 0.5 mass % or less where the entire amount of the zirconia powder is 100 mass %. When the content of the colorant is 0.005 mass % or more, intended coloring is easily obtained. That is, the color tone can be easily adjusted.

When $CuO$ is contained as the colorant, the content of the colorant is preferably 0.005 mass % or more and 1 mass % or less, more preferably 0.05 mass % or more and 0.6 mass % or less, and still more preferably 0.1 mass % or more and 0.3 mass % or less where the entire amount of the zirconia powder is 100 mass %. When the content of the colorant is 0.005 mass % or more, intended coloring is easily obtained. That is, the color tone can be easily adjusted.

When $TiO_2$ is contained as the colorant, the content of the colorant is preferably 0.005 mass % or more and 2 mass % or less, and more preferably 0.01 mass % or more and 1 mass % or less where the entire amount of the zirconia powder is 100 mass %. When the content of the colorant is 0.005 mass % or more, intended coloring is easily obtained. That is, the color tone can be easily adjusted.

<Relative Molding Density>

The zirconia powder preferably has a relative molding density of 45 to 50% when molded at a molding pressure of 2 t/cm². Here, the relative molding density is a value calculated by the following formula (4).

$$\text{Relative molding density (\%)} = (\text{molding density/theoretical sintered density}) \times 100 \qquad (4)$$

Here, the theoretical sintered density (denoted by $\rho_0$) is a value calculated by the formula (2-1) described in the section of "Method for measuring relative sintered density of zirconia sintered body" below. The upper limit of the relative molding density is preferably 45.5% or more, and more preferably 46% or more. The lower limit is preferably 49.5% or less, more preferably 49% or less, still more preferably 48.5% or less, and particularly preferably 48% or less.

The zirconia powder according to the present embodiment has been described above.

[Method for Producing Zirconia Powder]

Hereinafter, an example of a method for producing a zirconia powder will be described. However, the method for producing a zirconia powder is not limited to the following examples.

The method for producing a zirconia powder according to the present embodiment comprises:

step 1 of separately heating a zirconium salt solution and a sulfating agent solution to 95° C. or higher and 100° C. or lower;

step 2 of obtaining a basic zirconium sulfate-containing reaction liquid as a mixed liquid by bringing the zirconium salt solution after the heating and the sulfating agent solution after the heating into contact with each other in such a manner that the concentration of the mixed liquid does not change from the start to the end of the contact;

step 3 of aging the basic zirconium sulfate-containing reaction liquid obtained in step 2 at 95° C. or higher for 3 hours or more;

step 4 of adding a stabilizer to the basic zirconium sulfate-containing reaction liquid after the aging obtained in step 3;

step 5 of obtaining a zirconium-containing hydroxide by adding an alkali to the basic zirconium sulfate-containing reaction liquid obtained in step 4; and step 6 of obtaining a zirconia powder by heat-treating the zirconium-containing hydroxide obtained in step 5, in which in step 2, the $SO_4^{2-}/ZrO_2$ weight ratio in the mixed liquid is maintained in a range of 0.3 to 0.8 and the temperature of the mixed liquid is maintained at 95° C. or higher from the start to the end of the contact.

Hereinafter, each of the steps will be described in detail.

<Step 1>

In step 1, a zirconium salt solution and a sulfating agent solution as starting materials are separately heated to 95° C. or higher and 100° C. or lower.

The zirconium salt to be used for preparing the zirconium salt solution may be any one that supplies zirconium ions, and for example, zirconium oxynitrate, zirconium oxychloride, and zirconium nitrate can be used. One or two or more thereof may be used. Among these, zirconium oxychloride is preferable in terms of its high productivity on an industrial scale.

The solvent to be used for forming the zirconium salt solution may be chosen according to the type, etc. of the zirconium salt. Usually, water (pure water or ion-exchanged water, the same applies hereinafter) is preferable.

The concentration of the zirconium salt solution is not particularly limited, and in general, the zirconium salt is preferably contained in an amount of 5 to 250 g, more preferably 20 to 150 g, in terms of zirconium oxide ($ZrO_2$) based on 1000 g of the solvent.

The sulfating agent may be any one that reacts with zirconium ions to produce a sulfate (that is, a sulfating reagent), and examples thereof include sodium sulfate, potassium sulfate, ammonium sulfate, potassium hydrogen sulfate, sodium hydrogen sulfate, potassium disulfate, sodium disulfate, and sulfur trioxide. The sulfating agent may be in any form such as a powder or solution form, and a solution (especially, an aqueous solution) is preferable. As the solvent, the same solvent as the solvent to be used for preparing the zirconium salt solution can be used.

The acid concentration of the zirconium salt solution is preferably set to 0.1 to 2.0 N. By setting the acid concentration within the above range, the aggregation state of the particles constituting the zirconia powder can be controlled to a suitable state. The acid concentration can be adjusted by using, for example, hydrochloric acid, nitric acid, sodium hydroxide, or the like.

The concentration of the sulfating agent (the sulfating agent solution) is not particularly limited, and in general, it is preferable that the amount of the sulfating agent is 5 to 250 g, particularly 20 to 150 g, based on 1000 g of the solvent.

The containers for preparing the zirconium salt solution and the sulfating agent solution are not particularly limited with respect to their materials as long as the containers each have a capacity large enough for sufficiently stirring the zirconium salt solution and the sulfating agent solution. However, the containers preferably have equipment capable of appropriately heating such that the temperature of each solution does not fall below 95° C.

The heating temperature of the zirconium salt solution and the sulfating agent solution is just required to be 95° C. or higher and 100° C. or lower, and is preferably 97° C. or higher. When step 2 is performed while the temperature of the zirconium salt solution and the sulfating agent solution is kept lower than 95° C., the zirconium salt solution and the sulfating agent do not sufficiently react with each other, resulting in a lowered yield.

<Step 2>

In step 2, the heated zirconium salt solution and the heated sulfating agent solution are brought into contact with each other such that the concentration of a mixed liquid does not change from the start to the end of the contact, thereby affording a basic zirconium sulfate-containing reaction solution as a mixed liquid. Here, from the start to the end of the contact, the weight ratio $SO_4^{2-}/ZrO_2$ in the mixed liquid is maintained in a range of 0.3 to 0.8, and the temperature of the mixed liquid is maintained at 95° C. or higher.

Hereinafter, step 2 will be described with reference to drawings.

FIG. 1 is a schematic view for explaining a method for producing a zirconia powder according to the present embodiment. As shown in FIG. 1, the container 10 is connected to one end (left side in FIG. 1) above the T-shaped tube 20 via a valve 12. The container 30 is connected to the other end (the right side in FIG. 1) above the T-shaped tube 20 via a valve 32. In the container 10 is stored a zirconium solution heated to 95° C. or higher and 100° C. or lower. In the container 30 is stored a sulfating agent solution heated to 95° C. or higher and 100° C. or lower.

In step 2, the valve 12 is opened and the valve 32 is opened to bring the zirconium solution into contact with the sulfating agent solution. The mixed liquid (basic zirconium sulfate-containing reaction liquid) obtained by the contact immediately flows into an aging container 40 from the lower side of the T-shaped tube 20. In step 2, by such a method, the concentration of the reaction liquid (the concentration of the reaction liquid in the T-shaped tube 20) is prevented from changing from the start to the end of the contact of the zirconium solution with the sulfating agent solution. In step 2, since the concentration change of $SO_4^{2-}/ZrO_2$ from the start to the end of contact is suppressed, a uniform reactant is obtained. By adopting such a step (step 2), the peak top diameter, the pore volume, and the pore distribution width of primary particles can be controlled. That is, the size of the pores derived from the interparticle spaces of the primary particles in the secondary particles can be reduced, the distribution of the pores can be sharpened, and the volume of pores derived from the interparticle spaces of the primary particles can also be reduced.

The weight ratio $SO_4^{2-}/ZrO_2$ in the mixed liquid in step 2 is preferably within a range of 0.3 to 0.8, more preferably 0.4 to 0.7, and still more preferably 0.45 to 0.65. When the weight ratio $SO_4^{2-}/ZrO_2$ in the mixed liquid is 0.3 or more, the yield of basic zirconium sulfate as a reaction product can be increased. In addition, by adjusting the $SO_4^{2-}/ZrO_2$ weight ratio in the mixed liquid to 0.8 or less, it is possible to suppress the formation of a soluble salt of zirconium sulfate and to suppress a decrease in the yield of basic zirconium sulfate.

In step 2, in order to maintain the temperature of the mixed liquid at 95° C. or higher, it is preferable to install a heater in a tube (for example, T-shaped tube 20) or the like for supplying each solution.

Hereinafter, an example of step 2 will be specifically described.

When 213 g of a 25 mass % aqueous sodium sulfate solution and 450 g of an aqueous zirconium oxychloride solution with a concentration of 16 mass % in terms of $ZrO_2$ are brought into contact with each other using a T-shaped tube having a tube diameter L1 of 10 mm at one upper end (the left side in FIG. 1), a tube diameter L2 of 10 mm at the other upper end (the right side in FIG. 1), and a tube diameter L3 of 15 mm at the lower end as the T-shaped tube 20, the time (contact time) from the start of contact to the end of contact (until the aqueous zirconium chloride solution in the container 10 and the sulfating agent solution in the container 30 disappear) is preferably 30 seconds to 300 seconds, more preferably 60 seconds to 200 seconds, and still more preferably 90 seconds to 150 seconds.

<Step 3>

In step 3, the basic zirconium sulfate-containing reaction liquid obtained in step 2 is aged at 95° C. or higher for 3 hours or more. In step 3, for example, the basic zirconium sulfate-containing reaction liquid flowing into the aging container 40 is aged at 95° C. or higher for 3 hours or more while being stirred with a stirrer 42. The upper limit of the aging time is not particularly limited, and is, for example, 7 hours or less. The temperature (aging temperature) of the mixed liquid (the basic zirconium sulfate-containing reaction liquid) in step 3 is preferably 95° C. or higher, and more preferably 97° C. or higher and 100° C. or lower. By setting the aging temperature to 95° C. or higher and the aging time to 3 hours or more, basic zirconium sulfate is sufficiently produced, and the yield can be increased.

The mixed liquid contains basic zirconium sulfate as a main component, and is a basic zirconium sulfate slurry.

<Step 4>

In step 4, a stabilizer is added to the basic zirconium sulfate-containing reaction liquid after aging obtained in step 3.

<Step 5>

In step 5, an alkali is added to the basic zirconium sulfate-containing reaction solution obtained in step 4 to perform a neutralization reaction. Neutralization produces a zirconium-containing hydroxide.

The alkali is not limited, and examples thereof include sodium hydroxide, sodium carbonate, ammonia, and hydrazine ammonium bicarbonate. The alkali is not particularly limited in concentration, and one diluted with water and having a concentration of 5 to 30% is usually used.

While as a method for adding the alkali there are two methods: (1) adding an alkali solution to the basic zirconium sulfate-containing reaction liquid and (2) adding the basic zirconium sulfate-containing reaction liquid to an alkali solution, the method is not particularly limited and either method may be used.

After the neutralization, the slurry is filtered to afford a zirconium-containing hydroxide. The zirconium-containing hydroxide is preferably washed with pure water or the like to remove impurities, as necessary. After washing with water, drying or the like may be performed, as necessary.

<Step 6>

In step 6, the zirconium-containing hydroxide obtained in step 5 is subjected to heat treatment (firing) to oxidize the zirconium-containing hydroxide, thereby affording a zirconia powder.

The heat treatment temperature (firing temperature) and the heat treatment time (firing time) of the zirconium-containing hydroxide are not particularly limited, and the heat treatment is usually performed at about 600 to 1050° C. for 1 hour to 10 hours. The firing temperature is more preferably 650° C. or higher and 1000° C. or lower, and still more preferably 700° C. or higher and 980° C. or lower. The firing temperature is more preferably 2 hours to 6 hours, and still more preferably 2 hours to 4 hours. By setting the heat treatment temperature to 600° C. or higher and 1000° C. or lower, the specific surface area of the resulting zirconia powder can be set to a suitable range (20 m$^2$/g or more and 60 m$^2$/g or less). By setting the heat treatment temperature to 600° C. or higher and 1050° C. or lower, the pore distribution of the resulting zirconia powder can be set to a suitable range. The heat treatment atmosphere is not particularly limited, and may be usually in the air or an oxidizing atmosphere.

<Step 7>

After step 6, the resulting zirconia powder may be pulverized to form a slurry, as necessary. In this case, a binder may be added in order to improve moldability. When a slurry is not intended to form (is not intended to pulverize), the binder and the zirconia powder may be uniformly mixed with a kneading machine.

The binder is preferably an organic binder. The organic binder is likely to be removed from the molded body in a heating furnace in an oxidizing atmosphere, and a degreased body can be obtained, whereby finally, impurities are less likely to remain in the sintered body.

Examples of the organic binder include those that are soluble in alcohol, or those that are soluble in mixed liquids of two or more selected from the group consisting of alcohols, water, aliphatic ketones, and aromatic hydrocarbons. Examples of the organic binder include at least one selected from the group consisting of polyethylene glycol, glycol fatty acid ester, glycerol fatty acid ester, polyvinyl butyral, polyvinyl methyl ether, polyvinyl ethyl ether, and vinyl propionate. The organic binder may further contain one or more thermoplastic resins that are insoluble in alcohols, or the mixed liquids.

After the addition of the organic binder, a target zirconia powder can be obtained by performing such treatment as drying or pulverization by applying a publicly-known method.

The particle diameter $D_{50}$ of the zirconia powder can be controlled by the pulverization of step 7. For example, pulverization is performed according to the state of the zirconia powder obtained in step 5, and the particle diameter $D_{50}$ of the zirconia powder can thereby be controlled within a range of 0.1 μm or more and 0.7 μm or less.

In the case of adding a sintering aid, a colorant, or the like, a zirconia powder containing the sintering aid, the colorant, or the like can be obtained by adding and mixing them after step 6. As a more detailed method of mixing, it is preferable to disperse the mixture in pure water or the like to form a slurry, followed by wet-mixing.

In the case where step 7 is performed, a sintering aid, a colorant, or the like may be added when step 7 is performed.

The zirconia powder according to the present embodiment has been described above.

[Method for Producing Zirconia Sintered Body]

Hereinafter, an example of a method for producing a zirconia sintered body will be described. However, the method for producing a zirconia sintered body of the present invention is not limited to the following examples.

The method for producing a zirconia sintered body according to the present embodiment comprises: step X of molding the zirconia powder to obtain a molded body; and step Y of sintering the molded body at 1100° C. or higher and 1350° C. or lower and for 1 hour or more and 5 hours or less after the step X.

In the method for producing a zirconia sintered body according to the present embodiment, first, a zirconia powder is prepared. As the zirconia powder, one described in the section of [Zirconia powder] can be used.

Next, the zirconia powder is molded to afford a molded body (step X). For the molding, a commercially available molding machine and a cold isostatic pressing method (CIP) can be employed. The zirconia powder may be temporarily molded by a molding machine and then main-molded by press molding. The press molding may usually be in a range of 0.1 t to 3 t/cm$^2$. The pressure is preferably 0.5 t to 2.5 t/cm$^2$, more preferably 0.8 t to 2.2 t/cm$^2$, and still more preferably 1 t to 2 t/cm$^2$.

Next, the molded body is sintered at 1100° C. or higher and 1350° C. or lower for 1 hour or more and 5 hours or less (step Y).

In the present embodiment, since the zirconia powder described above is used, the sintering temperature can be set to a low temperature of 1100 to 1350° C. The sintering temperature is more preferably 1100° C. or higher and 1300° C. or lower, and 1100° C. or higher and 1250° C. or lower. The holding time during sintering is also not particularly limited, and is, for example, preferably about 1 to 5 hours, and more preferably 1 hour to 3 hours. The sintering atmosphere may be the air or an oxidizing atmosphere. Sintering may be performed under normal pressure, and pressurization is not particularly necessary.

The method for producing the stabilized zirconia sintered body according to the present embodiment has been described above.

[Zirconia Sintered Body]

In the following, an example of the zirconia sintered body according to the present embodiment is described. However, the zirconia sintered body of the present invention is not limited to the following example.

The zirconia sintered body according to the present embodiment is obtained by pressureless sintering using the zirconia powder described above. Since the zirconia sintered body according to the present embodiment is obtained by pressureless sintering using the zirconia powder, the zirconia sintered body has been sintered at a low temperature and has a high sintered density. Specifically, the zirconia sintered body is obtained by the above-described method for producing a zirconia sintered body.

<Relative Sintered Density>

The relative sintered density of the zirconia sintered body is preferably 98.5% or more, more preferably 99.0% or more, still more preferably 99.1% or more, particularly preferably 99.2% or more, especially preferably 99.3% or more, extremely preferably 99.4% or more, and more extremely preferably 99.5% or more. When the relative sintered density is 98.5% or more, the zirconia sintered body has higher strength.

<Method for Measuring Relative Sintered Density of Zirconia Sintered Body>

The relative sintered density refers to a relative sintered density represented by the following formula (1):

$$\text{relative sintered density (\%)} = (\text{sintered density/theoretical sintered density}) \times 100 \qquad (1)$$

Here, the theoretical sintered density ($\rho_0$) is a value calculated by the following formula (2-1).

$$\rho_0 = 100/[(Y/3.987) + (100-Y)/\rho z] \qquad (2-1)$$

However, $\rho z$ is a value calculated by the following formula (2-2).

$$\rho z = [124.25(100-X) + [\text{molecular weight of stabilizer}] \times X]/[150.5(100+X)A^2C] \qquad (2-2)$$

Here, as the molecular weight of the stabilizer is used 225.81 when the stabilizer is $Y_2O_3$, 382.52 when the stabilizer is $Er_2O_3$, and 394.11 when the stabilizer is $Yb_2O_3$.

X and Y are a stabilizer concentration (mol %) and an alumina concentration (wt %), respectively. A and C are respectively values calculated by the following formulae (2-3) and (2-4).

$$A = 0.5080 + 0.06980X/(100+X) \qquad (2-3)$$

$$C = 0.5195 - 0.06180X/(100+X) \qquad (2-4)$$

In the formula (1), the theoretical sintered density varies depending on the composition of the powder. For example, the theoretical sintered density of yttria-containing zirconia is 6.117 g/cm³ when the yttria content is 2 mol %, 6.098 g/cm³ when the yttria content is 3 mol %, and 6.051 g/cm³ when the yttria content is 5.5 mol % (in the case of $Al_2O_3=0$).

When the stabilizer is $Sc_2O_3$, $\rho z$ is a value calculated by the following formula (3).

$$\rho z = -0.0402 \ (\text{molar concentration of } Sc_2O_3) + 6.1294 \qquad (3)$$

When the stabilizer is CaO, $\rho z$ is a value calculated by the following formula (3-1).

$$\rho z = -0.0400 \ (\text{molar concentration of CaO}) + 6.1700 \qquad (3-1)$$

The theoretical sintered density (denoted by $\rho_1$) in the case of containing a colorant is $$\rho_1 = 100/[(Z/V) + (100-Z)/\rho_0] \qquad (2-5).$$

Z is a concentration (% by weight) of the colorant, and V is a theoretical density (g/cm³) of the colorant.

The theoretical density of the colorant is 5.24 g/cm³ for $Fe_2O_3$, 5.61 g/cm³ for ZnO, 5.03 g/cm³ for $MnO_2$, 6.10 g/cm³ for CoO, 5.22 g/cm³ for $Cr_2O_3$, 4.23 g/cm³ for $TiO_2$, 7.80 g/cm³ for $Tb_4O_7$, 6.31 g/cm³ for CuO, and 3.36 g/cm³ for $V_2O_5$.

The sintered density is measured by the Archimedes method.

According to the zirconia powder and the method for producing a zirconia sintered body of the present embodiment, since a sintered body having a high sintered density can be obtained even by sintering at a low temperature of 1100° C. to 1350° C., various publicly-known molding methods such as press molding, injection molding, cast molding, and sheet molding can be widely used. Moreover, since the zirconia powder of the present embodiment is easily mass-produced, the zirconia powder is superior also in cost competitiveness and can be suitably used for various applications.

The zirconia sintered body according to the present embodiment can be used as an industrial part, an aesthetic part, or a dental material. More specifically, the zirconia sintered body can be used for jewelry, watch parts, watch faces, artificial teeth, members for molding processing, wear resistant members, chemical resistant members, etc.

EXAMPLES

Hereinafter, the present invention will be described in detail with reference to Examples, but the present invention is not limited to the following Examples as long as the gist thereof is not deviated. The zirconia powder and the zirconia sintered body in each of Examples and Comparative Examples contain hafnium oxide as an unavoidable impurity in an amount of 1.3 to 2.5 mass % based on zirconium oxide (calculated by the following Formula (X)).

$$([\text{Mass of hafnium oxide}]/([\text{mass of zirconium oxide}] + [\text{mass of hafnium oxide}])) \times 100(\%) \qquad <\text{Formula (X)}>$$

[Preparation of Zirconia Powder]

Example 1

213 g of a 25 mass % aqueous sodium sulfate solution and 450 g of an aqueous zirconium oxychloride solution with a concentration of 16 mass % in terms of $ZrO_2$ (acid concentration: 1 N) were separately heated to 95° C. (step 1). Thereafter, the heated aqueous solutions were brought into contact with each other over 2 minutes such that the mass ratio of $SO_4^{2-}/ZrO_2$ in the mixed liquid was 0.50 (step 2).

Next, the obtained basic zirconium sulfate-containing reaction solution was aged by holding it at 95° C. for 4 hours to afford basic zirconium sulfate (step 3).

Next, the aged solution was cooled to room temperature, and then an aqueous yttrium chloride solution with a concentration of 10 mass % in terms of $Y_2O_3$ was added such that a concentration of $Y_2O_3$ was 3 mol %, and the mixture was uniformly mixed (step 4).

Next, a 25 mass % aqueous sodium hydroxide solution was added to the resulting mixed solution to neutralize the mixed solution until the pH reached 13 or higher, thereby a hydroxide precipitate was formed (step 5).

The obtained hydroxide precipitate was collected by filtration and sufficiently washed with water, and the obtained hydroxide was dried at 105° C. for 24 hours. The dried hydroxide was heat-treated at 960° C. (firing temperature) in the air for 2 hours to afford an unpulverized zirconia-based powder (yttria-stabilized zirconia-based powder) (step 6).

An alumina powder having an average particle diameter of primary particles of 0.1 μm was added to the obtained unpulverized yttria-stabilized zirconia-based powder in an amount of 0.25 mass % based on the yttria-stabilized zirconia-based powder, and the mixture was pulverized and mixed for 40 hours with a wet ball mill using water as a dispersion medium. Zirconia beads φ5 mm were used for the pulverization. The zirconia slurry obtained after the pulverization was dried at 110° C. to afford a zirconia powder according to Example 1.

Specifically, the above operation was performed with an apparatus as described with reference to FIG. 1.

Example 2

A zirconia powder according to Example 2 was obtained in the same manner as in Example 1 except that the firing temperature was changed to 860° C.

Example 3

A zirconia powder according to Example 3 was obtained in the same manner as in Example 2. The zirconia sintered body according to Example 3 differs from the zirconia sintered body according to Example 2 in molding conditions at the time of preparing a molded body and sintering conditions at the time of preparing a sintered body.

Example 4

A zirconia powder according to Example 4 was obtained in the same manner as in Example 1 except that the amount of the alumina powder added was changed to 0.1 mass % and the firing temperature was changed to 860° C.

Example 5

A zirconia powder according to Example 5 was obtained in the same manner as in Example 1 except that the aqueous yttrium chloride solution with a concentration of 10 mass % in terms of $Y_2O_3$ was added such that the concentration of $Y_2O_3$ was not 3 mol % but 5.6 mol % and the firing temperature was changed to 880° C.

Example 6

A zirconia powder according to Example 6 was obtained in the same manner as in Example 1 except that the aqueous yttrium chloride solution with a concentration of 10 mass % in terms of $Y_2O_3$ was added such that the concentration of $Y_2O_3$ was not 3 mol % but 7 mol % and the firing temperature was changed to 900° C.

Example 7

A zirconia powder according to Example 7 was obtained in the same manner as in Example 1 except that the firing temperature was changed to 830° C.

Example 8

A zirconia powder according to Example 8 was obtained in the same manner as in Example 1 except that the amount of the alumina powder added was changed to 0.24 mass % and the firing temperature was changed to 760° C.

Example 9

A zirconia powder according to Example 9 was obtained in the same manner as in Example 1 except that the amount of the alumina powder added was changed to 0.24 mass % and the firing temperature was changed to 700° C.

Example 10

A zirconia powder according to Example 10 was obtained in the same manner as in Example 1 except that no alumina powder was added.

Example 11

A zirconia powder according to Example 11 was obtained in the same manner as in Example 1 except that no alumina powder was added and the firing temperature was changed to 860° C.

Example 12

A zirconia powder according to Example 12 was obtained in the same manner as in Example 1 except that no alumina powder was added and the firing temperature was changed to 760° C.

Example 13

A zirconia powder according to Example 13 was obtained in the same manner as in Example 1 except that the aqueous yttrium chloride solution with a concentration of 10 mass % in terms of $Y_2O_3$ was added such that the concentration of $Y_2O_3$ was not 3 mol % but 1.6 mol % and the firing temperature was changed to 860° C.

Example 14

A zirconia powder according to Example 14 was obtained in the same manner as in Example 1 except that the aqueous yttrium chloride solution with a concentration of 10 mass % in terms of $Y_2O_3$ was added such that the concentration of $Y_2O_3$ was not 3 mol % but 2 mol % and the firing temperature was changed to 860° C.

Example 15

A zirconia powder according to Example 15 was obtained in the same manner as in Example 1 except that calcium carbonate ($CaCO_3$) was added such that the concentration thereof was 4 mol % in terms of CaO instead of adding the aqueous yttrium chloride solution and the firing temperature was changed to 1000° C.

Example 16

A zirconia powder according to Example 16 was obtained in the same manner as in Example 1 except that calcium carbonate ($CaCO_3$) was added such that the concentration thereof was 17 mol % in terms of CaO instead of adding the aqueous yttrium chloride solution and the firing temperature was changed to 1000° C.

Example 17

A zirconia powder according to Example 17 was obtained in the same manner as in Example 1 except that an aqueous erbium chloride solution with a concentration of 10 mass % in terms of $Er_2O_3$ was added such that the concentration of $Er_2O_3$ was 1.6 mol % instead of adding the aqueous yttrium chloride solution, the amount of the alumina powder added was changed to 0.26 mass %, and the firing temperature was changed to 860° C.

Example 18

A zirconia powder according to Example 18 was obtained in the same manner as in Example 1 except that the aqueous yttrium chloride solution with a concentration of 10 mass % in terms of $Y_2O_3$ was added such that the concentration of $Y_2O_3$ was not 3 mol % but 1 mol %, an aqueous erbium chloride solution with a concentration of 10 mass % in terms of $Er_2O_3$ was added such that the concentration of $Er_2O_3$ was 1 mol %, 0.25 mass % of ZnO was added, and the firing temperature was changed to 860° C.

Example 19

A zirconia powder according to Example 19 was obtained in the same manner as in Example 1 except that an aqueous cerium chloride solution with a concentration of 10 mass % in terms of $CeO_2$ was added such that the concentration of $CeO_2$ was 10 mol % instead of adding the aqueous yttrium chloride solution, the amount of the alumina powder added was changed to 0.29 mass %, and the firing temperature was changed to 980° C.

Example 20

A zirconia powder according to Example 20 was obtained in the same manner as in Example 1 except that an aqueous cerium chloride solution with a concentration of 12 mass % in terms of $CeO_2$ was added such that the concentration of $CeO_2$ was 12 mol % instead of adding the aqueous yttrium chloride solution, the amount of the alumina powder added was changed to 0.28 mass %, and the firing temperature was changed to 980° C.

Example 21

A zirconia powder according to Example 21 was obtained in the same manner as in Example 1 except that the aqueous yttrium chloride solution with a concentration of 10 mass % in terms of $Y_2O_3$ was added such that the concentration of $Y_2O_3$ was not 3 mol % but 2 mol %, 0.6 mass % of an $Fe_2O_3$ powder was added instead of adding the alumina powder, and the firing temperature was changed to 860° C.

Example 22

A zirconia powder according to Example 22 was obtained in the same manner as in Example 1 except that the aqueous yttrium chloride solution with a concentration of 10 mass % in terms of $Y_2O_3$ was added such that the concentration of $Y_2O_3$ was not 3 mol % but 2 mol %, 0.6 mass % of an $Fe_2O_3$ powder was added instead of adding 0.25 mass % of the alumina powder, and the firing temperature was changed to 860° C.

Example 23

A zirconia powder according to Example 23 was obtained in the same manner as in Example 1 except that 0.18 mass % of an $Fe_2O_3$ powder was added in addition to 0.25 mass % of the alumina powder and the firing temperature was changed to 860° C.

Example 24

A zirconia powder according to Example 24 was obtained in the same manner as in Example 1 except that the amount of the alumina powder added was changed to 0.1 mass %, an $MnO_2$ powder was added in an amount of 0.04 mass % in addition to the addition of the alumina powder, and the firing temperature was changed to 860° C.

Example 25

A zirconia powder according to Example 25 was obtained in the same manner as in Example 1 except that the aqueous yttrium chloride solution with a concentration of 10 mass % in terms of $Y_2O_3$ was added such that the concentration of $Y_2O_3$ was not 3 mol % but 2.6 mol %, 0.25 mass % of a ZnO powder was added in addition to the addition of the alumina powder, and the firing temperature was changed to 860° C.

Example 26

A zirconia powder according to Example 26 was obtained in the same manner as in Example 1 except that the aqueous yttrium chloride solution with a concentration of 10 mass % in terms of $Y_2O_3$ was added such that the concentration of $Y_2O_3$ was not 3 mol % but 2.6 mol %, 0.7 mass % of an $Fe_2O_3$ powder, 1.2 mass % of a CoO powder, 1.3 mass % of a $Cr_2O_3$ powder, and 0.7 mass % of a $TiO_2$ powder were added in addition to the addition of the alumina powder, and the firing temperature was changed to 860° C.

Example 27

A zirconia powder according to Example 27 was obtained in the same manner as in Example 1 except that the aqueous yttrium chloride solution with a concentration of 10 mass % in terms of $Y_2O_3$ was added such that the concentration of $Y_2O_3$ was not 3 mol % but 2.6 mol %, the amount of the alumina powder added was changed to 0.7 mass %, 1.1 mass % of an $MnO_2$ powder, 1.2 mass % of a CoO powder, and 1.3 mass % of a $Cr_2O_3$ powder were added in addition to the addition of the alumina powder, and the firing temperature was changed to 860° C.

Example 28

A zirconia powder according to Example 28 was obtained in the same manner as in Example 1 except that the aqueous yttrium chloride solution with a concentration of 10 mass % in terms of $Y_2O_3$ was added such that the concentration of $Y_2O_3$ was not 3 mol % but 2.6 mol %, the amount of the alumina powder added was changed to 0.6 mass %, 1.9 mass % of a CoO powder was added in addition to the addition of the alumina powder, and the firing temperature was changed to 860° C.

Example 29

A zirconia powder according to Example 29 was obtained in the same manner as in Example 1 except that the aqueous yttrium chloride solution with a concentration of 10 mass % in terms of $Y_2O_3$ was added such that the concentration of $Y_2O_3$ was not 3 mol % but 2.6 mol %, the amount of the alumina powder added was changed to 0.25 mass %, and 0.2 mass % of a $Tb_4O_7$ powder was added.

Example 30

A zirconia powder according to Example 30 was obtained in the same manner as in Example 1 except that the $SO_4^{2-}/ZrO_2$ mass ratio of the mixed liquid was adjusted to 0.60.

Example 31

A zirconia powder according to Example 31 was obtained in the same manner as in Example 1 except that 213 g of a 25 mass % aqueous sodium sulfate solution and 450 g of an aqueous zirconium oxychloride solution with a concentration of 16 mass % in terms of $ZrO_2$ (acid concentration: 1 N) were separately heated to 99° C.

Example 32

A zirconia powder according to Example 32 was obtained in the same manner as in Example 1 except that the heated aqueous solutions were brought into contact with each other over 4 minutes.

Example 33

A zirconia powder according to Example 33 was obtained in the same manner as in Example 1 except that the aqueous scandium chloride solution with a concentration of 10 mass % in terms of $Sc_2O_3$ was added such that the concentration of $Sc_2O_3$ was 3 mol % instead of adding the aqueous yttrium chloride solution and the firing temperature was changed to 860° C.

Example 34

A zirconia powder according to Example 34 was obtained in the same manner as in Example 1 except that 0.3 mass % of a CuO powder was added in addition to the addition of 0.25 mass % of the alumina powder and the firing temperature was changed to 860° C.

Example 35

A zirconia powder according to Example 35 was obtained in the same manner as in Example 1 except that 0.03 mass % of a $V_2O_5$ powder was added in addition to 0.25 mass % of the alumina powder and the firing temperature was changed to 860° C.

Example 36

A zirconia powder according to Example 36 was obtained in the same manner as in Example 1 except that the aqueous yttrium chloride solution with a concentration of 10 mass % in terms of $Yb_2O_3$ was added such that the concentration of $Yb_2O_3$ was 3 mol % instead of adding the aqueous yttrium chloride solution.

Example 37

A zirconia powder according to Example 37 was obtained in the same manner as in Example 1 except that calcium carbonate ($CaCO_3$) was added such that the concentration thereof was 6 mol % in terms of CaO instead of adding the aqueous yttrium chloride solution, the amount of the alumina powder added was changed to 0 mass %, and the firing temperature was changed to 1000° C.

Example 38

A zirconia powder according to Example 38 was obtained in the same manner as in Example 1 except that calcium carbonate ($CaCO_3$) was added such that the concentration thereof was 10.6 mol % in terms of CaO instead of adding the aqueous yttrium chloride solution, the amount of the alumina powder added was changed to 0 mass %, and the firing temperature was changed to 950° C.

Example 39

A zirconia powder according to Example 39 was obtained in the same manner as in Example 1 except that calcium carbonate ($CaCO_3$) was added such that the concentration thereof was 8.8 mol % in terms of CaO instead of adding the aqueous yttrium chloride solution, the amount of the alumina powder added was changed to 0.1 mass %, and the firing temperature was changed to 950° C.

Example 40

A zirconia powder according to Example 40 was obtained in the same manner as in Example 1 except that the aqueous yttrium chloride solution with a concentration of 10 mass % in terms of $Y_2O_3$ was added such that the concentration of $Y_2O_3$ was not 3 mol % but 3.2 mol % and the amount of the alumina powder added was changed to 0 mass %.

Example 41

A zirconia powder according to Example 41 was obtained in the same manner as in Example 1 except that the aqueous yttrium chloride solution with a concentration of 10 mass % in terms of $Y_2O_3$ was added such that the concentration of $Y_2O_3$ was not 3 mol % but 3.2 mol % and the amount of the alumina powder added was changed to 0.1 mass %.

Example 42

A zirconia powder according to Example 42 was obtained in the same manner as in Example 1 except that the aqueous yttrium chloride solution with a concentration of 10 mass % in terms of $Y_2O_3$ was added such that the concentration of $Y_2O_3$ was not 3 mol % but 3.2 mol % and the amount of the alumina powder added was changed to 0.25 mass %.

Example 43

A zirconia powder according to Example 43 was obtained in the same manner as in Example 1 except that the aqueous yttrium chloride solution with a concentration of 10 mass % in terms of $Y_2O_3$ was added such that the concentration of $Y_2O_3$ was not 3 mol % but 3.2 mol %, the firing temperature was changed to 860° C., and the amount of the alumina powder added was changed to 0.1 mass %.

Example 44

A zirconia powder according to Example 44 was obtained in the same manner as in Example 1 except that the aqueous yttrium chloride solution with a concentration of 10 mass % in terms of $Y_2O_3$ was added such that the concentration of $Y_2O_3$ was not 3 mol % but 4.0 mol % and the amount of the alumina powder added was changed to 0.1 mass %.

Example 45

A zirconia powder according to Example 45 was obtained in the same manner as in Example 1 except that the aqueous yttrium chloride solution with a concentration of 10 mass % in terms of $Y_2O_3$ was added such that the concentration of $Y_2O_3$ was not 3 mol % but 5.6 mol % and the amount of the alumina powder added was changed to 0.1 mass %.

Example 46

A zirconia powder according to Example 46 was obtained in the same manner as in Example 1 except that the aqueous yttrium chloride solution with a concentration of 10 mass % in terms of $Y_2O_3$ was added such that the concentration of $Y_2O_3$ was not 3 mol % but 1.7 mol %, the firing temperature was changed to 860° C., and the amount of an $MnO_2$ powder added instead of the alumina powder was changed to 1.0 mass %.

Example 47

A zirconia powder according to Example 47 was obtained in the same manner as in Example 1 except that the amount of the alumina powder added was changed to 0.5 mass %, the amount of the $Fe_2O_3$ powder added was changed to 0.1 mass %, and the amount of the $MnO_2$ powder added was changed to 0.3 mass %.

Example 48

A zirconia powder according to Example 48 was obtained in the same manner as in Example 1 except that the amount of the alumina powder added was changed to 0.5 mass %, the amount of the $MnO_2$ powder added was changed to 0.3 mass %, and the amount of the CoO powder added was changed to 0.1 mass %.

Example 49

A zirconia powder according to Example 49 was obtained in the same manner as in Example 1 except that an aqueous cerium chloride solution with a concentration of 10 mass % in terms of $CeO_2$ was added such that the concentration of $CeO_2$ was 11 mol % instead of adding the aqueous yttrium chloride solution, the firing temperature was changed to 780° C., the amount of the alumina powder added was changed to 0.5 mass %, and the amount of the $MnO_2$ powder added was changed to 0.5 mass %.

Example 50

A zirconia powder according to Example 51 was obtained in the same manner as in Example 1 except that an aqueous terbium chloride solution with a concentration of 10 mass % in terms of $Tb_4O_7$ was added such that the concentration of $Tb_4O_7$ was 2.0 mol % instead of adding the aqueous yttrium chloride solution and the firing temperature was changed to 780° C.

Comparative Example 1

187 g (72 g in terms of $ZrO_2$) of zirconium oxychloride-octahydrate was dissolved in ion-exchanged water, and then the solution was adjusted with 35% hydrochloric acid and ion-exchanged water to have an acid concentration of 0.67 N and a $ZrO_2$ concentration of 4 w/v %.

The obtained solution was heated to 60° C. and 1065 g of 5% sodium sulfate (sulfating agent) was added at that temperature. Next, a zirconia powder according to Comparative Example 1 was obtained in the same manner as in Example 1 except that the resulting solution was heated to 95° C., held at this temperature for 15 minutes, and then allowed to cool to room temperature, affording a basic zirconium sulfate-containing slurry. That is, the zirconia powder according to Comparative Example 1 was obtained in the same manner as in Example 1 in step 3 and the following steps.

Comparative Example 2

A 5 mass % solution of sodium sulfate was obtained by dissolving a sodium sulfate powder in ion-exchanged water. The resulting sodium sulfate solution was heated and held at 85° C.

On the other hand, a zirconium oxychloride salt solution was prepared to contain zirconium in a concentration of 1 mass % in terms of zirconia, and the zirconium salt solution was heated and held at 85° C. The total amount of zirconia was adjusted to 100 g.

Next, 1000 g of the entire amount of the sodium sulfate solution held at a constant temperature of 85° C. was added to and mixed with the zirconium salt solution held at a constant temperature of 85° C. in 10 seconds with stirring, affording a basic zirconium sulfate slurry. An yttrium chloride solution was added thereto such that the amount of yttria was 3.0 mol % based on the amount of zirconia, and then neutralization was performed using sodium hydroxide, affording a hydroxide.

The hydroxide was collected by filtration, washed with water, and then fired at a firing temperature of 1000° C. in an electric furnace, affording an oxide. Thereafter, an alumina powder having an average particle diameter of 0.1 μm was added to the oxide in an amount of 0.25 mass %, and the resulting mixture was pulverized and mixed for 30 hours in a wet ball mill using water as a dispersion medium. The obtained slurry was subjected to constant-temperature drying at 120° C., affording a target zirconia powder. In this way, a zirconia powder according to Comparative Example 2 was obtained.

Comparative Example 3

A zirconia powder according to Comparative Example 3 was obtained in the same manner as in Example 1 except that the heated aqueous solutions were brought into contact with each other over 3 hours such that the $SO_4^{2-}/ZrO_2$ mass ratio of the mixed liquid was adjusted to 0.50.

Comparative Example 4

A zirconia powder according to Comparative Example 4 was obtained in the same manner as in Example 1 except that the holding temperatures of the sodium sulfate solution and the zirconium salt solution were each changed to 60° C. and the sodium sulfate solution and the zirconium salt solution were mixed together at 60° C.

[Measurement of Specific Surface Area]

The specific surface area of the zirconia powder of each of Examples and Comparative Examples was measured by the BET method using a specific surface area meter ("Macsorb", manufactured by Mountec). The results are shown in Tables 3 and 4.

[Measurement of Pore Volume]

The pore distribution of the zirconia powder of each of Examples and Comparative Examples was obtained by a mercury intrusion method using a pore distribution measuring device ("Autopore IV9500" manufactured by Micromeritics). The measurement conditions were set as follows.

<Measurement Conditions>

Measuring device: pore distribution measuring device (Autopore IV9500 manufactured by Micromeritics)

Measuring range: 0.0036 to 10.3 μm

Number of measurement points: 120 points

Mercury contact angle: 140 degrees

Mercury surface tension: 480 dyne/cm

Using the obtained pore distribution, a peak top diameter, a pore volume, and a pore distribution width in a range of 10 nm or more and 200 nm or less were determined. The results are shown in Tables 3 and 4.

Here, the pore distribution width refers to a width of a peak at which the log differential pore volume is 0.1 ml/g or more.

Figure 2:
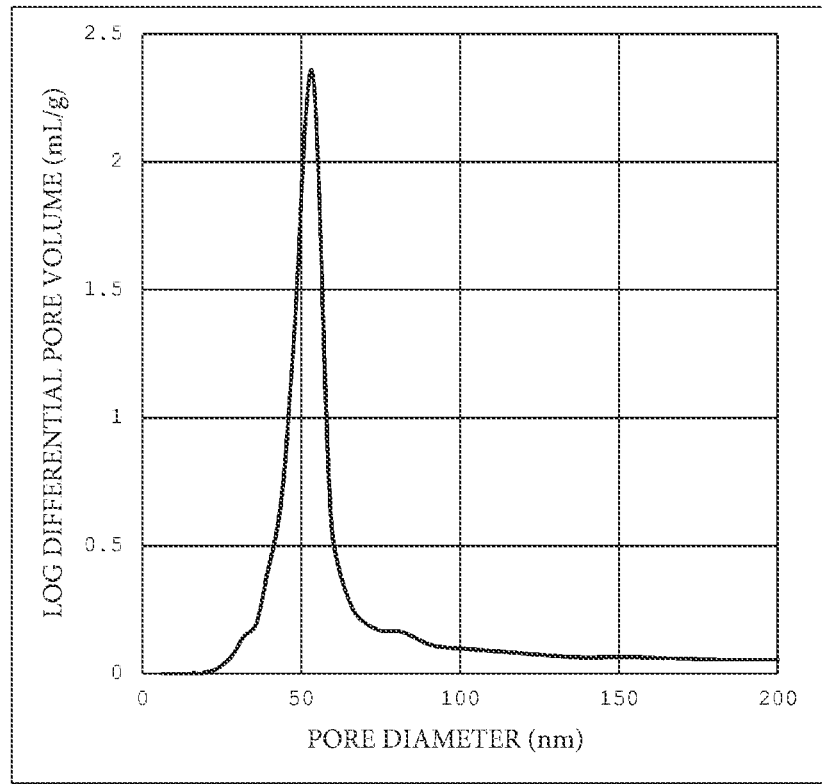
FIG. 2 is the pore distribution of the zirconia powder of Example 1.
Figure 3:
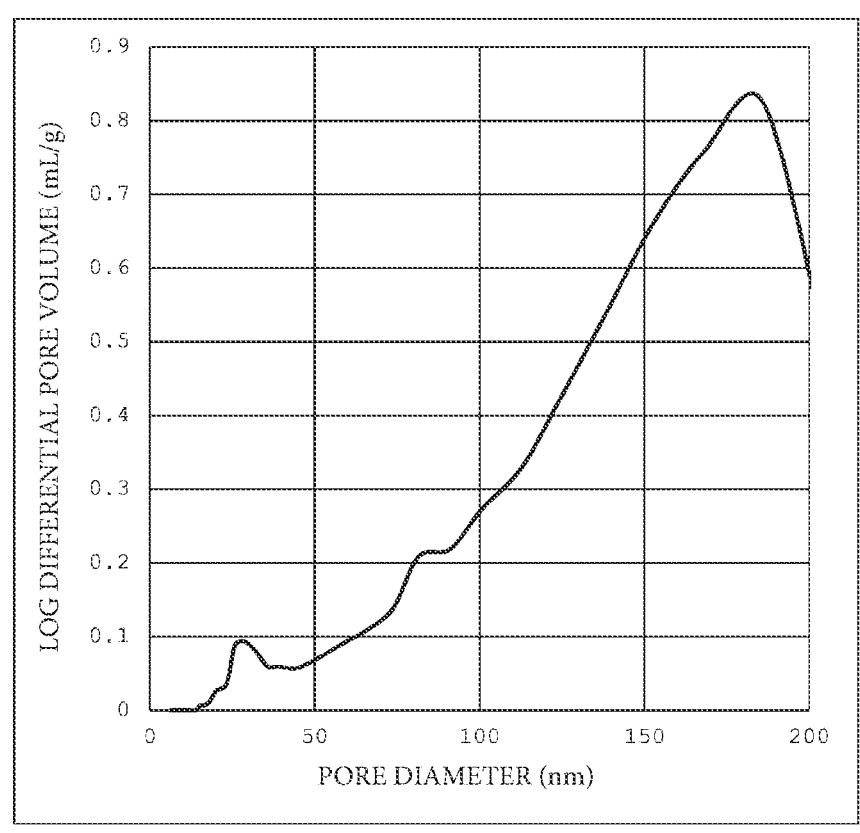
FIG. 3 is the pore distribution of the zirconia powder of Comparative Example 2.
Figure 4:
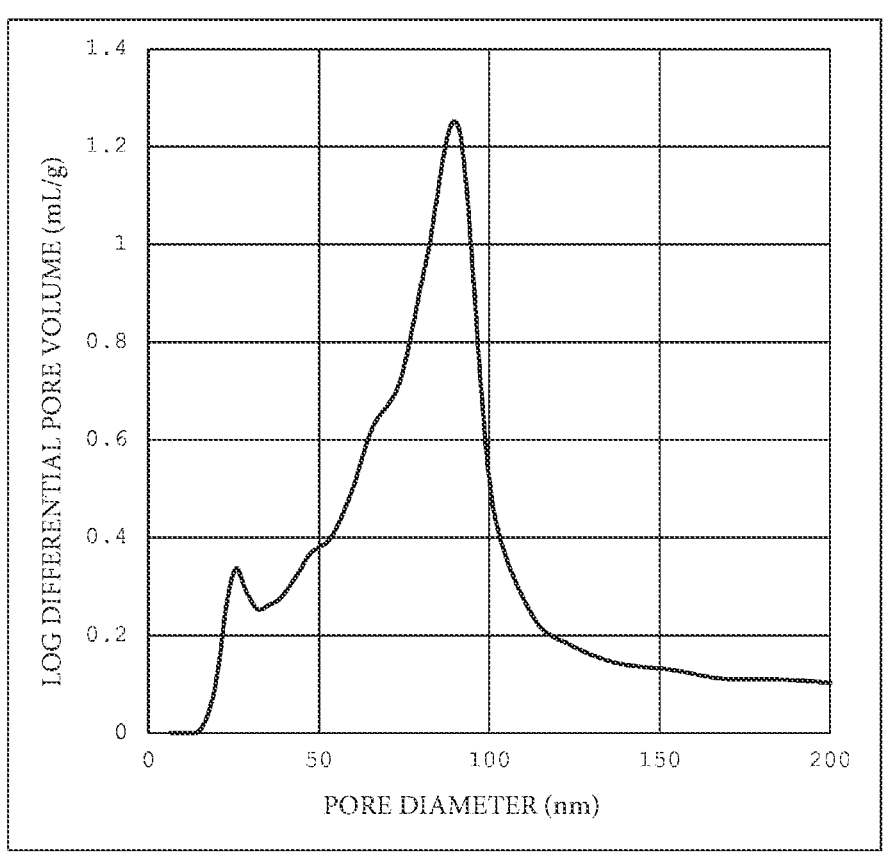
FIG. 4 is the pore distribution of the zirconia powder of Comparative Example 4.

For reference, FIG. 2 shows the pore distribution of the zirconia powder of Example 1, FIG. 3 shows the pore distribution of the zirconia powder of Comparative Example 2, and FIG. 4 shows the pore distribution of the zirconia powder of Comparative Example 4.

[Composition Measurement]

The compositions (in terms of oxide) of the zirconia powders of Examples and Comparative Examples were analyzed using ICP-AES ("ULTIMA-2" manufactured by HORIBA). The results are shown in Tables 1 and 2.

[Measurement of Particle Diameter $D_{50}$]

0.15 g of the zirconia powder of each of Examples and Comparative Examples and 40 ml of a 0.2% sodium hexametaphosphate aqueous solution were placed in a 50-ml beaker, and dispersed in an ultrasonic homogenizer "Sonifier S-450D" (Emerson Japan, Ltd.) for 5 minutes, followed by placing the dispersed product in a device (laser diffraction type particle size distribution measuring device ("SALD-2300" manufactured by Shimadzu Corporation)) for measurement. The results are shown in Tables 3 and 4.

[Preparation of Zirconia Sintered Body]

First, from the zirconia powder of each of Examples and Comparative Examples was manufactured a molded body by a cold isostatic pressing method (CIP). The molding pressure was 1 t/cm² only in Example 3, and was 2 t/cm² except for Example 3.

At this time, the relative molding density of the molded body was determined as follows. The results are shown in Tables 3 and 4.

Next, the molded body was sintered at 1100° C. for 2 hours (Example 49), affording a zirconia sintered body.

Alternatively, the molded body was sintered at 1150° C. for 2 hours (Example 14, Examples 20 to 22, Examples 46 to 48), affording a zirconia sintered body.

The molded body was sintered at 1200° C. for 2 hours (Examples 1 to 9, 13 to 32, and 50, Comparative Examples 1, 3, and 4), affording a zirconia sintered body.

The molded body was sintered at 1250° C. for 2 hours (Examples 40 to 45), affording a zirconia sintered body.

The molded body was sintered at 1300° C. for 2 hours (Examples 10 to 12 and 39), affording a zirconia sintered body.

The molded body was sintered at 1325° C. for 2 hours (Examples 37 and 38), affording a zirconia sintered body.

In Comparative Example 2, since sintering was not performed at 1300° C. or lower, the sintered density was not measured.

The relative sintered density of the obtained zirconia sintered bodies was determined as follows. The results are shown in Tables 3 and 4. In Tables 3 and 4, "–" indicates that measurement was not performed.

<Relative Sintered Density>

$$\text{relative sintered density (\%)} = (\text{sintered density/theoretical sintered density}) \times 100 \quad (1)$$

Here, the theoretical sintered density ($\rho_0$) is a value calculated by the following formula (2-1).

$$\rho 0 = 100/[(Y/3.987) + (100-Y)/\rho z] \quad (2\text{-}1)$$

However, $\rho z$ is a value calculated by the following formula (2-2).

$$\rho z = [124.25(100-X) + [\text{molecular weight of stabilizer}] \times X]/[150.5(100+X)A^2C] \quad (2\text{-}2)$$

Here, as the molecular weight of the stabilizer is used 225.81 when the stabilizer is $Y_2O_3$, 382.52 when the stabilizer is $Er_2O_3$, and 394.11 when the stabilizer is $Yb_2O_3$.

X and Y are a stabilizer concentration (mol %) and an alumina concentration (wt %), respectively. A and C are respectively values calculated by the following formulae (2-3) and (2-4).

$$A = 0.5080 + 0.06980X/(100+X) \quad (2\text{-}3)$$

$$C = 0.5195 - 0.06180X/(100+X) \quad (2\text{-}4)$$

In the formula (1), the theoretical sintered density varies depending on the composition of the powder. For example, the theoretical sintered density of yttria-containing zirconia is 6.117 g/cm³ when the yttria content is 2 mol %, 6.098 g/cm³ when the yttria content is 3 mol %, and 6.051 g/cm³ when the yttria content is 5.5 mol % (in the case of $Al_2O_3=0$).

When the stabilizer is $Sc_2O_3$, $\rho z$ is a value calculated by the following formula (3).

$$\rho z = -0.0402 \text{ (molar concentration of } Sc_2O_3) + 6.1294 \quad (3)$$

When the stabilizer is CaO, $\rho z$ is a value calculated by the following formula (3-1).

$$\rho z = -0.0400 \text{ (molar concentration of CaO)} + 6.1700 \quad (3\text{-}1)$$

The theoretical sintered density (denoted by $\rho 1$) in the case of containing a colorant is $$\rho 1 = 100/[(Z/V) + (100-Z)/\rho 0] \quad (2\text{-}5).$$

Z is a concentration (% by weight) of the colorant, and V is a theoretical density (g/cm³) of the colorant.

The theoretical density of the colorant was 5.24 g/cm³ for $Fe_2O_3$, 5.61 g/cm³ for ZnO, 5.03 g/cm³ for $MnO_2$, 6.10 g/cm³ for CoO, 5.22 g/cm³ for $Cr_2O_3$, 4.23 g/cm³ for $TiO_2$, 7.80 g/cm³ for $Tb_4O_7$, 6.31 g/cm³ for CuO, and 3.36 g/cm³ for $V_2O_5$.

The sintered density was measured by the Archimedes method.

<Relative Molding Density>

$$\text{Relative molding density (\%)} = (\text{molding density/theoretical sintered density}) \times 100 \quad (4)$$

Here, the theoretical sintered density ($\rho_0$) is a value calculated by the above formula (2-1).

<Total Light Transmittance>

The total light transmittance of the zirconia sintered body of each of Examples 37 to 45 obtained above was measured by a method in accordance with JIS K 7361 using a spectral haze meter (device name: SH-7000, manufactured by Nippon Denshoku Industries Co., Ltd.) and a D65 light source. The measurement sample was polished on both sides to adjust the thickness to 1 mm. The results are shown in Table 4.

TABLE 1

| | Stabilizer | | | | | | Additive (sintering aid and/or colorant) | | | | | | | | | |
|---|---|---|---|---|---|---|---|---|---|---|---|---|---|---|---|---|
| | $Y_2O_3$ mol % | $Er_2O_3$ mol % | $CeO_2$ mol % | $SC_2O_3$ mol % | CaO mol % | $Yb_2O_3$ mol % | $Al_2O_3$ mass % | $Fe_2O_3$ mass % | ZnO mass % | $MnO_2$ mass % | CoO mass % | $Cr_2O_3$ mass % | $TiO_2$ mass % | $Tb_4O_7$ mass % | CuO mass % | $V_2O_5$ mass % |
| Example 1 | 3 | — | — | — | — | — | 0.25 | — | — | — | — | — | — | — | — | — |
| Example 2 | 3 | — | — | — | — | — | 0.25 | — | — | — | — | — | — | — | — | — |
| Example 3 | 3 | — | — | — | — | — | 0.25 | — | — | — | — | — | — | — | — | — |
| Example 4 | 3 | — | — | — | — | — | 0.1 | — | — | — | — | — | — | — | — | — |
| Example 5 | 5.6 | — | — | — | — | — | 0.25 | — | — | — | — | — | — | — | — | — |
| Example 6 | 7 | — | — | — | — | — | 0.25 | — | — | — | — | — | — | — | — | — |
| Example 7 | 3 | — | — | — | — | — | 0.25 | — | — | — | — | — | — | — | — | — |
| Example 8 | 3 | — | — | — | — | — | 0.24 | — | — | — | — | — | — | — | — | — |
| Example 9 | 3 | — | — | — | — | — | 0.24 | — | — | — | — | — | — | — | — | — |
| Example 10 | 3 | — | — | — | — | — | <0.005 | — | — | — | — | — | — | — | — | — |
| Example 11 | 3 | — | — | — | — | — | <0.005 | — | — | — | — | — | — | — | — | — |
| Example 12 | 3 | — | — | — | — | — | <0.005 | — | — | — | — | — | — | — | — | — |
| Example 13 | 1.6 | — | — | — | — | — | 0.25 | — | — | — | — | — | — | — | — | — |
| Example 14 | 2 | — | — | — | — | — | 0.25 | — | — | — | — | — | — | — | — | — |
| Example 15 | — | — | — | — | 4 | — | 0.25 | — | — | — | — | — | — | — | — | — |
| Example 16 | — | — | — | — | 17 | — | 0.25 | — | — | — | — | — | — | — | — | — |
| Example 17 | — | 1.6 | — | — | — | — | 0.26 | — | — | — | — | — | — | — | — | — |
| Example 18 | 1 | 1 | — | — | — | — | 0.25 | — | 0.25 | — | — | — | — | — | — | — |
| Example 19 | — | — | 10 | — | — | — | 0.29 | — | — | — | — | — | — | — | — | — |
| Example 20 | — | — | 12 | — | — | — | 0.28 | — | — | — | — | — | — | — | — | — |
| Example 21 | 2 | — | — | — | — | — | <0.005 | 0.6 | — | — | — | — | — | — | — | — |
| Example 22 | 2 | — | — | — | — | — | 0.25 | 0.6 | — | — | — | — | — | — | — | — |
| Example 23 | 3 | — | — | — | — | — | 0.25 | 0.18 | — | — | — | — | — | — | — | — |
| Example 24 | 3 | — | — | — | — | — | 0.1 | — | — | 0.04 | — | — | — | — | — | — |
| Example 25 | 2.6 | — | — | — | — | — | 0.25 | — | 0.25 | — | — | — | — | — | — | — |
| Example 26 | 2.6 | — | — | — | — | — | 0.25 | 0.7 | — | — | 1.2 | 1.3 | 0.7 | — | — | — |
| Example 27 | 2.6 | — | — | — | — | — | 0.7 | — | — | 1.1 | 1.2 | 1.3 | — | — | — | — |
| Example 28 | 2.6 | — | — | — | — | — | 0.6 | — | — | — | 1.9 | — | — | — | — | — |
| Example 29 | 2.6 | — | — | — | — | — | 0.25 | — | — | — | — | — | — | 0.2 | — | — |
| Example 30 | 3 | — | — | — | — | — | 0.25 | — | — | — | — | — | — | — | — | — |
| Example 31 | 3 | — | — | — | — | — | 0.25 | — | — | — | — | — | — | — | — | — |
| Example 32 | 3 | — | — | — | — | — | 0.25 | — | — | — | — | — | — | — | — | — |
| Example 33 | — | — | — | 3 | — | — | 0.25 | — | — | — | — | — | — | — | — | — |
| Example 34 | 3 | — | — | — | — | — | 0.25 | — | — | — | — | — | — | — | 0.3 | — |
| Example 35 | 3 | — | — | — | — | — | 0.25 | — | — | — | — | — | — | — | — | 0.03 |
| Example 36 | — | — | — | — | — | 3 | 0.25 | — | — | — | — | — | — | — | — | — |
| Comparative Example 1 | 3 | — | — | — | — | — | 0.25 | — | — | — | — | — | — | — | — | — |
| Comparative Example 2 | 3 | — | — | — | — | — | 0.25 | — | — | — | — | — | — | — | — | — |
| Comparative Example 3 | 3 | — | — | — | — | — | 0.25 | — | — | — | — | — | — | — | — | — |
| Comparative Example 4 | 3 | — | — | — | — | — | 0.25 | — | — | — | — | — | — | — | — | — |

TABLE 2

| | Stabilizer | | | | | | | Additive (sintering aid and/or colorant) | | | | | | | | | |
|---|---|---|---|---|---|---|---|---|---|---|---|---|---|---|---|---|---|
| | $Y_2O_3$ mol % | $Er_2O_3$ mol % | $CeO_2$ mol % | $SC_2O_3$ mol % | CaO mol % | $Tb_4O_7$ mol % | $Y_2O_3$ mol % | $Al_2O_3$ mass % | $Fe_2O_3$ mass % | ZnO mass % | $MnO_2$ mass % | CoO mass % | $Cr_2O_3$ mass % | $TiO_2$ mass % | $Tb_4O_7$ mass % | CuO mass % | $V_2O_5$ mass % |
| Example 37 | — | — | — | — | 6.0 | — | — | 0 | — | — | — | — | — | — | — | — | — |
| Example 38 | — | — | — | — | 10.6 | — | — | 0 | — | — | — | — | — | — | — | — | — |
| Example 39 | — | — | — | — | 8.8 | — | — | 0.1 | — | — | — | — | — | — | — | — | — |
| Example 40 | 3.2 | — | — | — | — | — | — | 0 | — | — | — | — | — | — | — | — | — |
| Example 41 | 3.2 | — | — | — | — | — | — | 0.1 | — | — | — | — | — | — | — | — | — |

TABLE 2-continued

| | Stabilizer | | | | | | | Additive (sintering aid and/or colorant) | | | | | | | | | |
|---|---|---|---|---|---|---|---|---|---|---|---|---|---|---|---|---|---|
| | $Y_2O_3$ mol % | $Er_2O_3$ mol % | $CeO_2$ mol % | $SC_2O_3$ mol % | CaO mol % | $Tb_4O_7$ mol % | $Y_2O_3$ mol % | $Al_2O_3$ mass % | $Fe_2O_3$ mass % | ZnO mass % | $MnO_2$ mass % | CoO mass % | $Cr_2O_3$ mass % | $TiO_2$ mass % | $Tb_4O_7$ mass % | CuO mass % | $V_2O_5$ mass % |
| Example 42 | 3.2 | — | — | — | — | — | — | 0.25 | — | — | — | — | — | — | — | — | — |
| Example 43 | 3.2 | — | — | — | — | — | — | 0.1 | — | — | — | — | — | — | — | — | — |
| Example 44 | 4 | — | — | — | — | — | — | 0.1 | — | — | — | — | — | — | — | — | — |
| Example 45 | 5.6 | — | — | — | — | — | — | 0.1 | — | — | — | — | — | — | — | — | — |
| Example 46 | 1.7 | — | — | — | — | — | — | — | — | — | 1.0 | — | — | — | — | — | — |
| Example 47 | 3 | — | — | — | — | — | — | 0.5 | 0.1 | — | 0.3 | — | — | — | — | — | — |
| Example 48 | 3 | — | — | — | — | — | — | 0.5 | — | — | 0.3 | 0.1 | — | — | — | — | — |
| Example 49 | — | — | 11 | — | — | — | — | 0.5 | — | — | 0.5 | — | — | — | — | — | — |
| Example 50 | — | — | — | — | — | 2 | — | 0.25 | — | — | — | — | — | — | — | — | — |

TABLE 3

| | Powder properties | | | | | Molded body | | | Sintered body: Sintered density | | |
|---|---|---|---|---|---|---|---|---|---|---|---|
| | Specific surface area m²/g | Average particle diameter pm | Peak top diameter nm | Pore distribution width nm | Pore volume mL/g | Molding density g/cm³ | Molding pressure t/cm² | Sintering time hr | 1150° C. g/cm³ | 1200° C. g/cm³ | 1300° C. g/cm³ |
| Example 1 | 26.0 | 0.14 | 54 | 63 | 0.44 | 2.89 | 2 | 2 | — | 99.1 | — |
| Example 2 | 32.2 | 0.16 | 54 | 78 | 0.48 | 2.81 | 2 | 2 | — | 99.4 | — |
| Example 3 | 32.2 | 0.16 | 54 | 78 | 0.48 | 2.81 | 1 | 5 | — | 99.3 | — |
| Example 4 | 32.4 | 0.15 | 54 | 77 | 0.48 | 2.81 | 2 | 2 | — | 99.4 | — |
| Example 5 | 28.1 | 0.17 | 53 | 75 | 0.46 | 2.80 | 2 | 2 | — | 99.3 | — |
| Example 6 | 26.5 | 0.18 | 52 | 73 | 0.45 | 2.80 | 2 | 2 | — | 99.2 | — |
| Example 7 | 38.4 | 0.23 | 39 | 70 | 0.42 | 2.85 | 2 | 2 | — | 99.5 | — |
| Example 8 | 48.3 | 0.27 | 36 | 55 | 0.44 | 2.86 | 2 | 2 | — | 99.4 | — |
| Example 9 | 53.5 | 0.28 | 32 | 46 | 0.42 | 2.85 | 2 | 2 | — | 99.3 | — |
| Example 10 | 22.4 | 0.21 | 52 | 62 | 0.43 | 2.88 | 2 | 2 | — | — | 99.5 |
| Example 11 | 34.1 | 0.27 | 38 | 56 | 0.44 | 2.93 | 2 | 2 | — | — | 99.7 |
| Example 12 | 45.3 | 0.28 | 33 | 45 | 0.43 | 2.92 | 2 | 2 | — | — | 99.6 |
| Example 13 | 38.2 | 0.13 | 44 | 53 | 0.35 | 2.94 | 2 | 2 | — | 99.5 | — |
| Example 14 | 29.3 | 0.18 | 44 | 60 | 0.36 | 2.93 | 2 | 2 | 94.3 | 99.6 | — |
| Example 15 | 24.2 | 0.15 | 74 | 94 | 0.37 | 2.91 | 2 | 2 | — | 98.5 | — |
| Example 16 | 24.8 | 0.17 | 72 | 90 | 0.36 | 2.69 | 2 | 2 | — | 98.7 | — |
| Example 17 | 31.0 | 0.14 | 44 | 60 | 0.37 | 2.93 | 2 | 2 | — | 99.5 | — |
| Example 18 | 30.5 | 0.17 | 45 | 58 | 0.38 | 2.84 | 2 | 2 | — | 99.5 | — |
| Example 19 | 34.7 | 0.27 | 67 | 85 | 0.30 | 2.94 | 2 | 2 | — | 98.9 | — |
| Example 20 | 38.6 | 0.26 | 58 | 85 | 0.30 | 2.92 | 2 | 2 | — | 98.7 | — |
| Example 21 | 29.5 | 0.13 | 38 | 70 | 0.41 | 2.89 | 2 | 2 | 99.5 | 99.6 | — |
| Example 22 | 29.3 | 0.13 | 39 | 71 | 0.41 | 2.89 | 2 | 2 | 99.5 | 99.6 | — |
| Example 23 | 29.4 | 0.13 | 38 | 69 | 0.41 | 2.90 | 2 | 2 | 99.5 | 99.6 | — |
| Example 24 | 35.1 | 0.14 | 42 | 62 | 0.39 | 2.86 | 2 | 2 | — | 99.4 | — |
| Example 25 | 30.6 | 0.16 | 41 | 63 | 0.40 | 2.89 | 2 | 2 | — | 99.4 | — |
| Example 26 | 30.8 | 0.16 | 42 | 61 | 0.40 | 2.89 | 2 | 2 | — | 99.4 | — |
| Example 27 | 30.7 | 0.15 | 42 | 63 | 0.41 | 2.90 | 2 | 2 | — | 99.4 | — |
| Example 28 | 29.5 | 0.19 | 40 | 64 | 0.41 | 2.89 | 2 | 2 | — | 99.3 | — |
| Example 29 | 34.8 | 0.15 | 43 | 63 | 0.40 | 2.87 | 2 | 2 | — | 99.5 | — |
| Example 30 | 24.0 | 0.16 | 49 | 58 | 0.42 | 2.91 | 2 | 2 | — | 99.2 | — |
| Example 31 | 24.5 | 0.15 | 51 | 60 | 0.41 | 2.91 | 2 | 2 | — | 99.1 | — |
| Example 32 | 23.0 | 0.19 | 59 | 68 | 0.36 | 2.85 | 2 | 2 | — | 98.6 | — |
| Example 33 | 22.7 | 0.24 | 61 | 77 | 0.37 | 2.95 | 2 | 2 | — | 99.7 | — |
| Example 34 | 27.3 | 0.19 | 52 | 61 | 0.41 | 2.90 | 2 | 2 | — | 99.4 | — |
| Example 35 | 27.5 | 0.21 | 56 | 52 | 0.42 | 2.96 | 2 | 2 | — | 99.1 | — |
| Example 35 | 26.7 | 0.18 | 53 | 62 | 0.43 | 2.99 | 2 | 2 | — | 99.2 | — |
| Comparative Example 1 | 42.5 | 0.49 | 74 | 125 | 0.62 | 2.85 | 2 | 2 | — | 98.3 | — |
| Comparative Example 2 | 14.7 | 0.78 | 186 | Unmeasurable (200 or more) | 0.24 | 2.96 | 2 | 2 | — | — | — |
| Comparative Example 3 | 63.0 | 1.2 | 37 | 55 | 0.69 | 2.75 | 2 | 2 | — | 97.6 | — |
| Comparative Example 4 | 32.6 | 0.29 | 91 | 166 | 0.45 | 2.80 | 2 | 2 | — | 98.0 | — |

TABLE 4

| | Powder properties | | | | | Molded body | | | Sintered body: Sintered density | | | | | | Total light |
|---|---|---|---|---|---|---|---|---|---|---|---|---|---|---|---|
| | Specific surface area m²/g | Average particle diameter pm | Peak top diameter nm | Pore distribution width nm | Pore volume mL/g | Molding density g/cm³ | Molding pressure t/cm² | Sintering time hr | 1100° C. g/cm³ | 1150° C. g/cm³ | 1200° C. g/cm³ | 1250° C. g/cm³ | 1300° C. g/cm³ | 1325° C. g/cm³ | transmittance % |
| Example 37 | 26.6 | 0.13 | 70 | 90 | 0.36 | 2.73 | 2 | 2 | — | — | — | — | — | 99.6 | 30 |
| Example 38 | 30.0 | 0.20 | 66 | 93 | 0.38 | 2.61 | 2 | 2 | — | — | — | — | — | 99.2 | 40 |
| Example 39 | 29.4 | 0.22 | 65 | 98 | 0.38 | 2.62 | 2 | 2 | — | — | — | — | 99.6 | — | 39 |
| Example 40 | 25.1 | 0.14 | 55 | 63 | 0.43 | 2.93 | 2 | 50 | — | — | — | 99.8 | — | — | 38 |
| Example 41 | 26.8 | 0.17 | 54 | 66 | 0.43 | 2.93 | 2 | 20 | — | — | — | 99.8 | — | — | 37 |
| Example 42 | 25.0 | 0.15 | 52 | 68 | 0.48 | 2.94 | 2 | 20 | — | — | — | 99.8 | — | — | 33 |
| Example 43 | 35.0 | 0.15 | 49 | 74 | 0.48 | 2.88 | 2 | 50 | — | — | — | 99.8 | — | — | 35 |
| Example 44 | 25.0 | 0.15 | 52 | 60 | 0.41 | 2.93 | 2 | 20 | — | — | — | 99.7 | — | — | 39 |
| Example 45 | 25.0 | 0.15 | 57 | 59 | 0.44 | 2.95 | 2 | 20 | — | — | — | 99.7 | — | — | 39 |
| Example 46 | 37.5 | 0.21 | 47 | 70 | 0.45 | 2.85 | 2 | 2 | — | 99.2 | — | — | — | — | — |
| Example 47 | 21.0 | 0.15 | 59 | 64 | 0.43 | 2.83 | 2 | 2 | — | 99.6 | — | — | — | — | — |
| Example 48 | 20.4 | 0.17 | 60 | 64 | 0.44 | 2.83 | 2 | 2 | — | 98.8 | — | — | — | — | — |
| Example 49 | 48.5 | 0.17 | 45 | 72 | 0.47 | 2.94 | 2 | 2 | 99.4 | — | — | — | — | — | — |
| Example 50 | 35.1 | 0.19 | 48 | 65 | 0.42 | 2.96 | 2 | 2 | — | — | 99.6 | — | — | — | — |

The invention claimed is:

1. A zirconia powder comprising a stabilizer, and having a specific surface area of 20 m²/g or more and 60 m²/g or less and a particle diameter $D_{50}$ of 0.1 μm or more and 0.7 μm or less, wherein in a range of 10 nm or more and 200 nm or less in a pore distribution based on a mercury intrusion method, a peak top diameter in a pore volume distribution is 20 nm or more and 85 nm or less, a pore volume is 0.2 ml/g or more and less than 0.5 ml/g, and a pore distribution width is 40 nm or more and 105 nm or less.

2. The zirconia powder according to claim 1, wherein the stabilizer is an oxide of one or more elements selected from among alkaline earth metals and rare earth elements.

3. The zirconia powder according to claim 1, wherein the stabilizer is one or more compounds selected from the group consisting of $Y_2O_3$, $CeO_2$, $Sc_2O_3$, $CaO$, $Er_2O_3$, and $Yb_2O_3$.

4. The zirconia powder according to claim 1, wherein the stabilizer is one or more compounds selected from the group consisting of $Y_2O_3$, $Sc_2O_3$, $CaO$, $Er_2O_3$, and $Yb_2O_3$.

5. The zirconia powder according to claim 3, wherein the stabilizer is $Y_2O_3$, and a content of the $Y_2O_3$ based on an entire amount of the zirconia powder is 1.4 mol % or more and 7.5 mol % or less.

6. The zirconia powder according to claim 3, wherein the stabilizer is $CeO_2$, and a content of the $CeO_2$ based on an entire amount of the zirconia powder is 10 mol % or more and 20 mol % or less.

7. The zirconia powder according to claim 3, wherein the stabilizer is $CeO_2$, and a content of the $CeO_2$ based on an entire amount of the zirconia powder is 10 mol % or more and 14 mol % or less.

8. The zirconia powder according to claim 3, wherein the stabilizer is $Sc_2O_3$, and a content of the $Sc_2O_3$ based on an entire amount of the zirconia powder is 1.4 mol % or more and 7.5 mol % or less.

9. The zirconia powder according to claim 3, wherein the stabilizer is $Er_2O_3$, and a content of the $Er_2O_3$ based on an entire amount of the zirconia powder is 1.4 mol % or more and 7.5 mol % or less.

10. The zirconia powder according to claim 3, wherein the stabilizer is $CaO$, and a content of the $CaO$ based on an entire amount of the zirconia powder is 3.5 mol % or more and 17 mol % or less.

11. The zirconia powder according to claim 3, wherein the stabilizer is $Yb_2O_3$, and a content of the $Yb_2O_3$ based on an entire amount of the zirconia powder is 1.4 mol % or more and 7.5 mol % or less.

12. The zirconia powder according to claim 1, wherein the specific surface area is 22 m²/g or more and 57 m²/g or less.

13. The zirconia powder according to claim 1, wherein the particle diameter $D_{50}$ is 0.1 μm or more and less than 0.3 μm.

14. The zirconia powder according to claim 1, comprising 0.005 mass % or more and 2 mass % or less in total of alumina and one or more metal oxides selected from the group consisting of metal oxides having a Tammann temperature of 1200° C. or lower.

15. The zirconia powder according to claim 1, wherein a total content of alumina and one or more metal oxides selected from the group consisting of metal oxides having a Tammann temperature of 1200° C. or lower is less than 0.005 mass %.

16. The zirconia powder according to claim 1, wherein the zirconia powder comprises one or more elements selected from the group consisting of Fe, V, Mn, Co, Cr, Tb, Zn, Cu, and Ti.

17. A method for producing a zirconia sintered body, the method comprising:

step X of molding the zirconia powder according to claim 1 to obtain a molded body; and step Y of sintering the molded body under conditions at 1100° C. or higher and 1350° C. or lower and for 1 hour or more and 5 hours or less after the step X.

* * * * *